US012287688B2

(12) United States Patent
Koorapati et al.

(10) Patent No.: US 12,287,688 B2
(45) Date of Patent: *Apr. 29, 2025

(54) INTEGRATED CIRCUITS (IC) CHIPS INCLUDING THROTTLE REQUEST ACCUMULATE CIRCUITS FOR CONTROLLING POWER CONSUMED IN PROCESSING CIRCUITS AND RELATED METHODS

(71) Applicant: QUALCOMM Incorporated, San Diego, CA (US)

(72) Inventors: Sagar Koorapati, Longview, TX (US); Vinod Chamarty, Campbell, CA (US); Gaurav Sanjeev Kirtane, Union City, CA (US); Pushkin Raj Pari, Bangalore (IN); Nitin Makhija, San Jose, CA (US); Alon Naveh, Corte Madera, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,217

(22) Filed: Apr. 1, 2024

(65) Prior Publication Data

US 2024/0427400 A1 Dec. 26, 2024

Related U.S. Application Data

(63) Continuation of application No. 18/339,447, filed on Jun. 22, 2023.

(51) Int. Cl.
*G06F 1/28* (2006.01)
(52) U.S. Cl.
CPC .................................... *G06F 1/28* (2013.01)

(58) Field of Classification Search
CPC ....... G06F 1/32; G06F 9/44; G06F 1/12; G06F 1/28
See application file for complete search history.

(56) References Cited

U.S. PATENT DOCUMENTS 6,636,976 B1 10/2003 Grochowski et al.
11,442,890 B1 9/2022 Volpe
(Continued)

OTHER PUBLICATIONS

U.S. Appl. No. 18/339,447, filed Jun. 22, 2023.
International Search Report and Written Opinion—PCT/US2024/028296—ISA/EPO—Sep. 2, 2024.

*Primary Examiner* — Keshab R Pandey
(74) *Attorney, Agent, or Firm* — QUALCOMM Incorporated

(57) ABSTRACT

The processor-based system includes a throttle request accumulate circuit to receive throttle requests, determine a highest or most aggressive throttle value among the throttle requests, and generate a throttle control signal configured to throttle activity in the plurality of processing circuits. Throttle requests have throttle values corresponding to a reduction in activity in at least a portion of the plurality of processing circuits and may correspond to a particular number of cycles of reduced activity in a window of cycles. In addition to reducing response time to local events or conditions compared to waiting for a hierarchical response, the throttle request accumulate circuit accumulates throttle requests from all circuits that adjust or throttle activity in the plurality of processing circuits, and ensures that the net effective throttle controlling activity in the processing circuits at any given time is based on the highest throttle value of those accumulated throttle requests.

21 Claims, 18 Drawing Sheets

(56) References Cited

U.S. PATENT DOCUMENTS

| | | |
|---|---|---|
| 2006/0206740 A1 | 9/2006 | Hurd |
| 2009/0222681 A1 | 9/2009 | Adachi |
| 2009/0300329 A1 | 12/2009 | Naffziger et al. |
| 2014/0372736 A1* | 12/2014 | Greenhalgh .......... G06F 9/3869 |
| | | 712/239 |
| 2019/0057035 A1* | 2/2019 | Gao ...................... G06F 3/0674 |
| 2021/0096635 A1* | 4/2021 | Kalyanam ............. G06F 1/3237 |
| 2021/0349759 A1* | 11/2021 | Bansal ................ G06F 9/45558 |
| 2022/0100247 A1 | 3/2022 | Garg et al. |
| 2022/0269298 A1 | 8/2022 | Rapaka et al. |
| 2024/0427397 A1 | 12/2024 | Koorapati et al. |

* cited by examiner

INTEGRATED CIRCUITS (IC) CHIPS INCLUDING THROTTLE REQUEST ACCUMULATE CIRCUITS FOR CONTROLLING POWER CONSUMED IN PROCESSING CIRCUITS AND RELATED METHODS

PRIORITY APPLICATION

The present application is a continuation of and claims priority to U.S. patent application Ser. No. 18/339,447, filed Jun. 22, 2023 and entitled "INTEGRATED CIRCUITS (IC) CHIPS INCLUDING THROTTLE REQUEST ACCUMULATE CIRCUITS FOR CONTROLLING POWER CONSUMED IN PROCESSING CIRCUITS AND RELATED METHODS," which is incorporated herein by reference in its entirety.

BACKGROUND

I. Field of the Disclosure

The field of the disclosure relates to processor-based systems (e.g., central processing unit (CPU)-based systems, graphic processing unit (GPU)-based systems), or neural network processing unit (NPU)-based systems, and more particularly, to power distribution management of circuits in the processor-based systems.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. Other examples of PUs may include neural network processing units or neural processing units (NPUs). CPUs are configured to execute software instructions that cause a processor to fetch data from a location in a memory and to perform one or more processor operations using the fetched data.

PUs are included in a computer system that includes other supporting processing devices (circuits) involved with or accessed as part of performing computing operations in the computer system. Examples of these other supporting processing devices include memory, input/output (I/O) devices, secondary storage, modems, video processors, and related interface circuits. The PUs and supporting processing devices in a computer system are referred to collectively as processing devices. Processing devices of a processor-based system can be provided in separate integrated circuits (ICs) in separate IC chips or may be aggregated in a larger IC, like a system-on-a-chip (SoC) IC, wherein some or all of these processing devices are integrated into the same IC chip. For example, an SoC IC chip may include a PU that includes a plurality of processor cores and supporting processing devices, such as a memory system that includes cache memory and memory controllers for controlling access to external memory, I/O interfaces, power management systems, etc. A SoC may be particularly advantageous for applications in which a limited area is available for the computer system (e.g., a mobile computing device such as a cellular device). To manage power distributed to the processing devices, the SoC may also include a power management system that includes one or more power rails in the SoC that supply power to its components. A separate power management integrated circuit (PMIC) that can be off-chip or on-chip with the SoC can independently control power supplied to the power rails. The SoC may be designed with a plurality of different power rails that are distributed within the SoC to provide power to various clusters of the processing devices for their operation. For example, all the processor cores in the SoC may be coupled to a common power rail for power, whereas supporting processing devices may be powered from separate power rails in the SoC, depending on the design of the SoC.

SUMMARY OF THE DISCLOSURE

Aspects disclosed herein include an integrated circuit (IC) chip including throttle request accumulate circuits for controlling power consumed in processing circuits. Related methods of throttle request accumulation in an IC chip are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), a graphics processing unit (GPU), or a neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., by controlling the voltage level) distributed at one or more power rails in the IC chip that provide power to the PUs and the integrated supporting processing devices. For example, the hierarchical power management system can be configured to provide additional power to certain power rails to supply power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note, as used herein, throttle can mean to take an action that will decrease or increase a parameter that affects power. This results in a respective decrease or increase in power consumption.

The hierarchical power management system is configured to throttle performance of the processing devices in the processor-based system because the level of processing activity in the processing devices in a SoC can vary based on workload conditions. Some power rails in the SoC may experience heightened current demand. It is desired that this current demand does not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop (e.g., a temporary reduction in voltage) in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to operate properly and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system may include local area management (LAM) circuits distributed in the IC chip that are each associated with and provided to monitor one or more processing circuits (also referred to as "processing devices") in the IC chip. The LAM circuits may be configured to generate power events associated with monitored processing circuits in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system. The PEL circuit may be configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state current demand (I) and current transients (di/dt), and thus its power consumption. Because the IC chip may be larger in terms of die area due to the integration of the PUs and integrated supporting processing devices, there can be a significant delay between when the PEL circuit receives a power event regarding power consumption of a monitored processing device and the PEL circuit throttling power in the IC chip to throttle power consumption in response. This delay can, for example, cause devices in the IC chip to temporarily continue to consume excess power that can cause thermal and/or power issues (e.g., di/dt issues, voltage droop, heat generation) or permanent damage before the power management circuit has time to react. Thus, in response to the power events, current demand and transients, and other monitoring and control circuits associated with each LAM circuit, localized control may also be asserted on the processing circuits to improve response time and avoid performance issues.

In this regard, the processor-based system includes, additionally or alternatively, a throttle request accumulate circuit that may be associated with a LAM circuit to receive throttle requests generated internal to or external to the LAM circuit and generate, based on the received throttle requests, a throttle control signal configured to throttle activity in the plurality of processing circuits. Throttle requests have throttle values corresponding to a requested reduction in activity in at least a portion of the plurality of processing circuits and may correspond to a particular number of cycles of reduced activity in a window of cycles. In addition to reducing response time to local events or conditions compared to waiting for a hierarchical response (e.g., through the LAM circuit or a higher level circuit), the throttle request accumulate circuit accumulates throttle requests from all circuits that may need to adjust or throttle activity in the plurality of processing circuits, and ensures that the net effective throttle controlling activity in the processing circuits at any given time is based on the accumulated throttle requests. In some examples, the throttle control signal is generated based on a highest or most aggressive throttle value among the throttle requests. In some examples, the throttle request accumulate circuit may receive throttle requests from an internal monitor circuit for measuring a rate of current change, a local thermal sensor, and a firmware control circuit, in addition to a hierarchical controller.

In this regard, in one exemplary aspect, an integrated circuit (IC) chip comprising a processor-based system is disclosed. The processor-based system includes first digital processing circuits configured to operate in response to a clock signal; and a first throttle request accumulation circuit comprising throttle request circuits configured to generate throttle values based on received throttle requests, wherein the throttle request accumulation circuit is configured to receive the throttle values generated in the throttle request circuits; and, in each cycle of the clock signal, generate a throttle control signal based on the received throttle values.

In another exemplary aspect, a method of accumulating throttle requests to generate a throttle control signal for controlling power in a processor-based system is disclosed. The method of accumulating throttle requests comprises operating first digital processing circuits in response to a clock signal; and generating, in first throttle request circuits in a cycle of the clock signal, throttle values based on received throttle requests. The method further includes receiving, in a throttle value circuit, the throttle values generated in the first throttle request circuits; and generating, in each cycle of the clock signal, a throttle control signal based on the received throttle values.

In another exemplary aspect, an integrated circuit (IC) chip for accumulating throttle requests to generate a throttle control signal for controlling power in a processor-based system is disclosed. The IC chip comprises: first digital processing means configured to operate in response to a clock signal; a first throttle request accumulation means configured to: throttle request circuits configured to generate, in each cycle of the clock signal, throttle values based on throttle requests received in the cycle of the clock signal; receive the throttle values generated in each of the throttle request circuits; and in each cycle of the clock signal, generate a throttle control signal based on the received throttle values.

DETAILED DESCRIPTION

Figure 1:
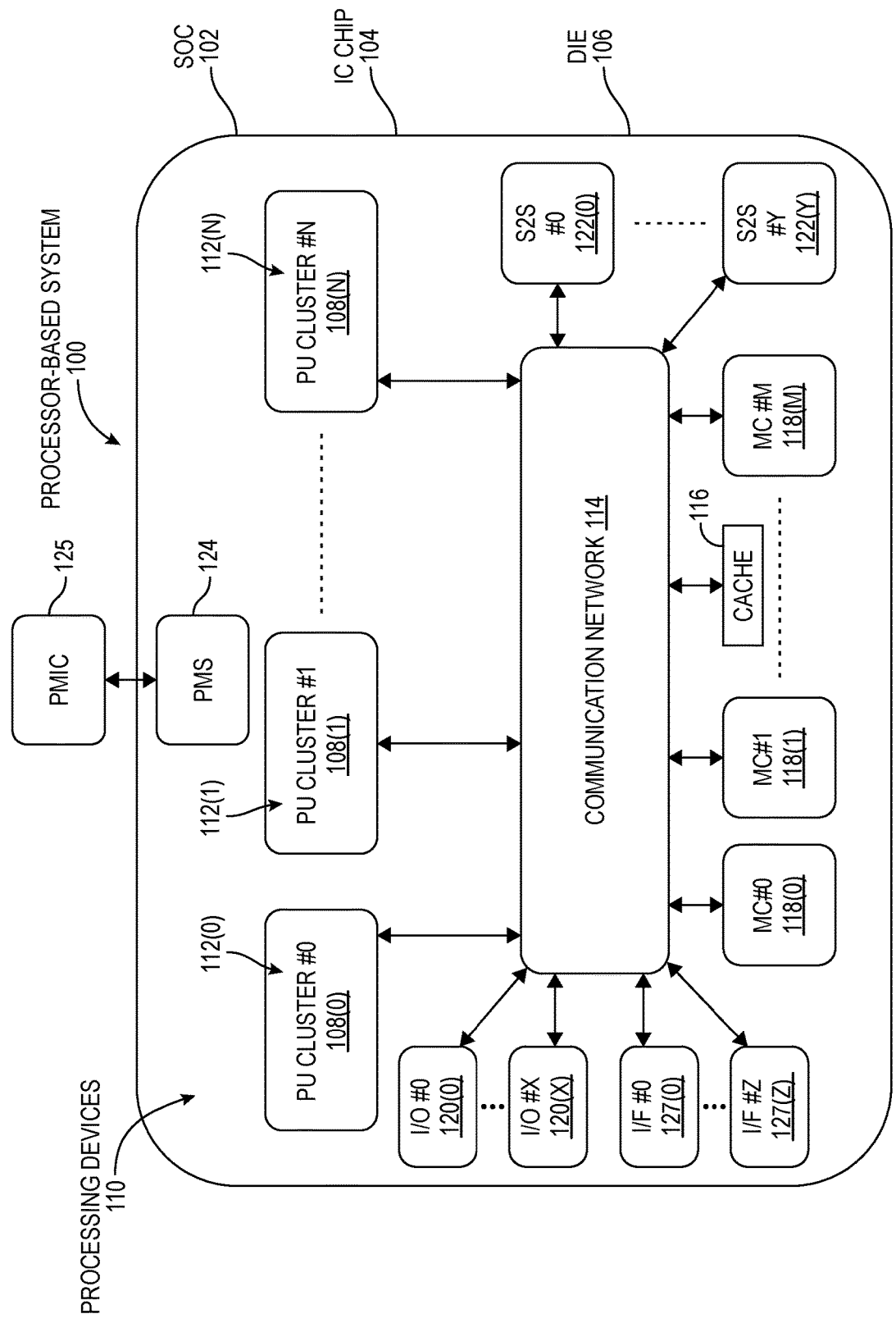
FIG. 1 is a schematic diagram of an exemplary processor-based system in the form of an exemplary system-on-a-chip (SoC) in an integrated circuit (IC) chip.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein may optionally include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU), or neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note, as used herein, throttle can mean to take an action that will decrease or increase a parameter that affects power and thus results in a respective decrease or increase in power consumption.

In exemplary aspects, the hierarchical power management system may include local area management (LAM) circuits distributed in the IC chip that are each associated with one or more processing devices in the IC chip. The LAM circuits may be configured to generate power events associated with its monitored processing devices in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state current demand and transient current demands (e.g., changes in current flow rate referred to as "di/dt") and thus affect power consumption. Because the IC chip may be larger in terms of die area due to the integration of the processing units and integrated supporting processing devices, there can be a significant delay between when PEL circuit receives a power event regarding the consumption of a monitored processing device and the PEL circuit throttling power in the IC chip to throttle power consumption in response. This delay can, for example, cause devices in the IC chip to temporarily continue to consume excess power that can cause performance issues (e.g., di/dt issues, voltage droop, heat generation) before the power management circuit has time to react.

In this regard, the processor-based system includes, additionally or alternatively, a throttle request accumulate circuit that may be associated with a LAM circuit to receive throttle requests generated internal to or external to the LAM circuit and generate, based on the received throttle requests, a throttle control signal configured to throttle activity in the plurality of processing circuits. Throttle requests have throttle values corresponding to a requested reduction in activity in at least a portion of the plurality of processing circuits and may correspond to a particular number of cycles of reduced activity in a window of cycles. In addition to reducing response time to local events or conditions compared to waiting for a hierarchical response (e.g., through the LAM circuit or a higher level circuit), the throttle request accumulate circuit accumulates throttle requests from all circuits that may need to adjust or throttle activity in the plurality of processing circuits, and ensures that the net effective throttle controlling activity in the processing circuits at any given time is based on the accumulated throttle requests. In some examples, the throttle control signal is generated based on a highest or most aggressive throttle value among the throttle requests. In some examples, the throttle request accumulate circuit may receive throttle requests from an internal monitor circuit for measuring a rate of current change, a local thermal sensor, and a firmware control circuit, in addition to a hierarchical controller.

In this regard, FIG. 1 is a schematic diagram of an exemplary processor-based system 100 in the form of an exemplary system-on-a-chip (SoC) 102 in an integrated circuit (IC) chip 104. Optionally, a hierarchical power management system can be provided. The SoC 102 may be employed in smaller mobile devices (e.g., a cellular phone, a laptop computer), as well as enterprise systems such as server chips in computer servers. The processor-based system 100 is first described with regard to FIG. 1 before exemplary hierarchical power management systems that can be provided in the processor-based system 100 to estimate and throttle power consumption in the IC chip 104 are described starting at FIG. 2 below.

With reference to FIG. 1, the processor-based system 100 is provided in a single semiconductor die 106 and integrated into a single IC chip 104. The processor-based system 100 includes a plurality of processing unit (PU) clusters 108(0)-108(N) that are examples of processing devices 110 in the processor-based system 100. Each of the PU clusters 108(0)-108(N) can include one or more processor cores 112(0)-112(N), which are each configured to execute instructions (e.g., software, firmware) to carry out tasks as is known for processors. For example, the PU clusters 108(0)-108(N) may be central processing unit (CPU) clusters wherein one or more of the processor cores 112(0)-112(N) includes CPUs and/or graphics processing unit (GPU) clusters, wherein one or more of the processor cores 112(0)-112(N) includes GPUs. The processor-based system 100 includes an internal communication network 114 that facilitates providing communication paths between the PU clusters 108(0)-108(N) and other supporting processing devices that are also considered to be processing devices to carry out desired processing requests and related processing tasks. The PU clusters 108(0)-108(N) are communicatively coupled to the internal communication network 114. The internal communication network 114 can be a coherent communication bus that provides a fabric in the processor-based system 100. The internal communication network 114 can be a network fabric that typically consists of network nodes and their communication lines, a network of wires, and/or communication channels that provide communication paths that provide reliable communication between different PU clusters 108(0)-108(N) and the supporting processing devices 110. Network nodes are the circuits, such as interconnected switches and routers, that provide a reliable network fabric that provides and receives data on the communication paths between different PU clusters 108(0)-108(N) and the supporting processing devices 110. The fabric provided by the internal communication network 114 also includes a network of wires or communication channels that allow different processing devices in the processor-based system 100 to communicate and exchange data with each other at high speeds.

For example, as shown in FIG. 1, the processor-based system 100 also includes internal cache memory 116 and memory controllers (MCs) 118(0)-118(M) as other types of processing devices 110 that provide access to memory. The cache memory 116 shown in FIG. 1 is a shared cache memory that is communicatively coupled to the internal communication network 114 and can be accessed by the PU clusters 108(0)-108(N) through the internal communication network 114. The processor-based system 100 may also include private cache memory and/or private shared cache memory that is integrated or privately accessible by one or more of the respective PU clusters 108(0)-108(N) without having to access such through the internal communications network 114. The memory controllers 118(0)-118(M) are communicatively coupled to the internal communication network 114 in the IC chip 104. The memory controllers 118(0)-118(M) provide the PU clusters 108(0)-108(N) access to memory for storing and retrieving data to carry out processing tasks. For example, the memory controllers 118(0)-118(M) may be coupled to external memory from the IC chip 104 or internal memory integrated into the IC chip 104.

Also, as shown in FIG. 1, the processor-based system 100 in this example also includes I/O interface circuits 120(0)-120(X) as other examples of processing devices 110 that are also communicatively coupled to the internal communication network 114. The I/O interface circuits 120(0)-120(X) provide access to I/O devices, which may be internal and integrated into the IC chip 104 or external to the IC chip 104. For example, the I/O interface circuits 120(0)-120(X) may be a peripheral component interconnect (PCI) interface circuits that are used for connecting I/O hardware devices to a processor-based system, like the processor-based system 100 in FIG. 1, to allow high-speed data to be transferred between devices and the PU clusters 108(0)-108(N) in the processor-based system 100.

Also, as shown in FIG. 1, the processor-based system 100 in this example also includes socket-to-socket (S2S) interface circuits 122(0)-122(Y) as other examples of processing devices 110 that are also communicatively coupled to the internal communication network 114. The S2S interface circuits 122(0)-122(Y) allow the processor-based system 100 to be coupled to another separate processor-based system (which may be like the processor-based system 100 in FIG. 1) in a socket-to-socket connection. For example, the processor-based system 100 shown in FIG. 1 may be a first CPU motherboard system that can be communicatively coupled to another processor-based system for communication through the internal communication network 114 and a coupled S2S interface circuit 122(0)-122(Y).

Also, as shown in FIG. 1, the processor-based system 100 in this example also includes other interface (I/F) circuits 127(0)-127(Z) as other examples of processing devices 110 that are also communicatively coupled to the internal communication network 114. The interface circuits 127(0)-127(Z) can provide an additional external communications interface to the SoC 102 and can be configured to provide a communication interface according to the desired standard or protocol. For example, the interface circuits 127(0)-127(Z) could be PCIe interface circuits that are configured to support PCIe communications with the SoC 102.

Thus, in the processor-based system 100 in FIG. 1, the internal communication network 114 enables different processing devices such as PU clusters 108(0)-108(N) and their processor cores 112(0)-112(N), caches, the memory controllers 118(0)-118(M), the I/O interface circuits 120(0)-120(X), and/or the S2S interface circuits 122(0)-122(Y) to work together efficiently. The fabric provided by the internal communication network 114 is designed to provide high bandwidth, low latency, and efficient routing of data between different processing devices of the processor-based system 100.

Also, as shown in FIG. 1 and as described in more detail below, the processor-based system 100 may also include a hierarchical power management system 124. In this example, the hierarchical power management system 124 is integrated into the same IC chip 104 and in the same die 106 that includes the PU clusters 108(0)-108(N) and the internal communication network 114. The hierarchical power management system 124 may be configured to control the power consumption of the processor-based system 100 by controlling the power consumption of some or all of the processing devices 110 in the IC chip 104. The hierarchical power management system 124 may be configured to manage power consumption to achieve a desired performance within an overall power budget for the IC chip 104. For example, the processor-based system 100 may have an overall power budget that is based on the ability of the IC chip 104 to dissipate heat generated by the operation of the processor-based system 100. The processor-based system 100 may also have an overall power budget that is based on a current limit of power rails in the IC chip 104. The power budget of the processor-based system 100 may also be based on the power supply limits of a power supply that is powering the processor-based system 100. Thus, the hierarchical power management system 124 can be configured to control power consumption by controlling the power level (e.g., voltage level) distributed at one or more of the power rails in the IC chip 104 that provide power to the processing devices 110 or by controlling operating frequency. For example, the hierarchical power management system 124 can be configured to cause additional power to be supplied to certain power rails, thus supplying power to higher current demanding devices to achieve higher performance while providing less power to other power rails to keep the overall power within power and/or thermal limits for the IC chip 104. For example, the hierarchical power management system 124 can be configured to communicate with or include a power management integrated circuit (PMIC) chip 125 (that can either be on-chip or off-chip to the SoC 120) to actually cause the power supplied to certain power rails to be adjusted.

Also, as discussed in more detail below, a hierarchical power management system 124 can also be configured to control power consumption in the processor-based system 100 by throttling performance, which may include controlling clock frequency and/or supply voltage on the power rails provided to the processing devices 110 in the processor-based system 100. Throttling performance may also include controlling activity that causes the consumption of power. These methods, in turn, throttle (i.e., reduce, maintain, or increase) the current demand of such processing devices 110 and, thus, their power consumption in the IC chip 104. Throttling may generally refer to any measure (for example, modifying activity, a clock frequency, and/or a supply voltage) to effect (i.e., reduce, maintain, or increase) power consumption. Performance of clocked circuits in the processing devices 110 in the processor-based system 100 in terms of frequency (f) is related to power (P) according to the power equation $P = c\, f\, V^2$, where 'c' is capacitance and 'V' is voltage. Thus, reducing the frequency of a clocked circuit in a processing device 110 in the processor-based system 100 also reduces its power consumption.

Figure 2:
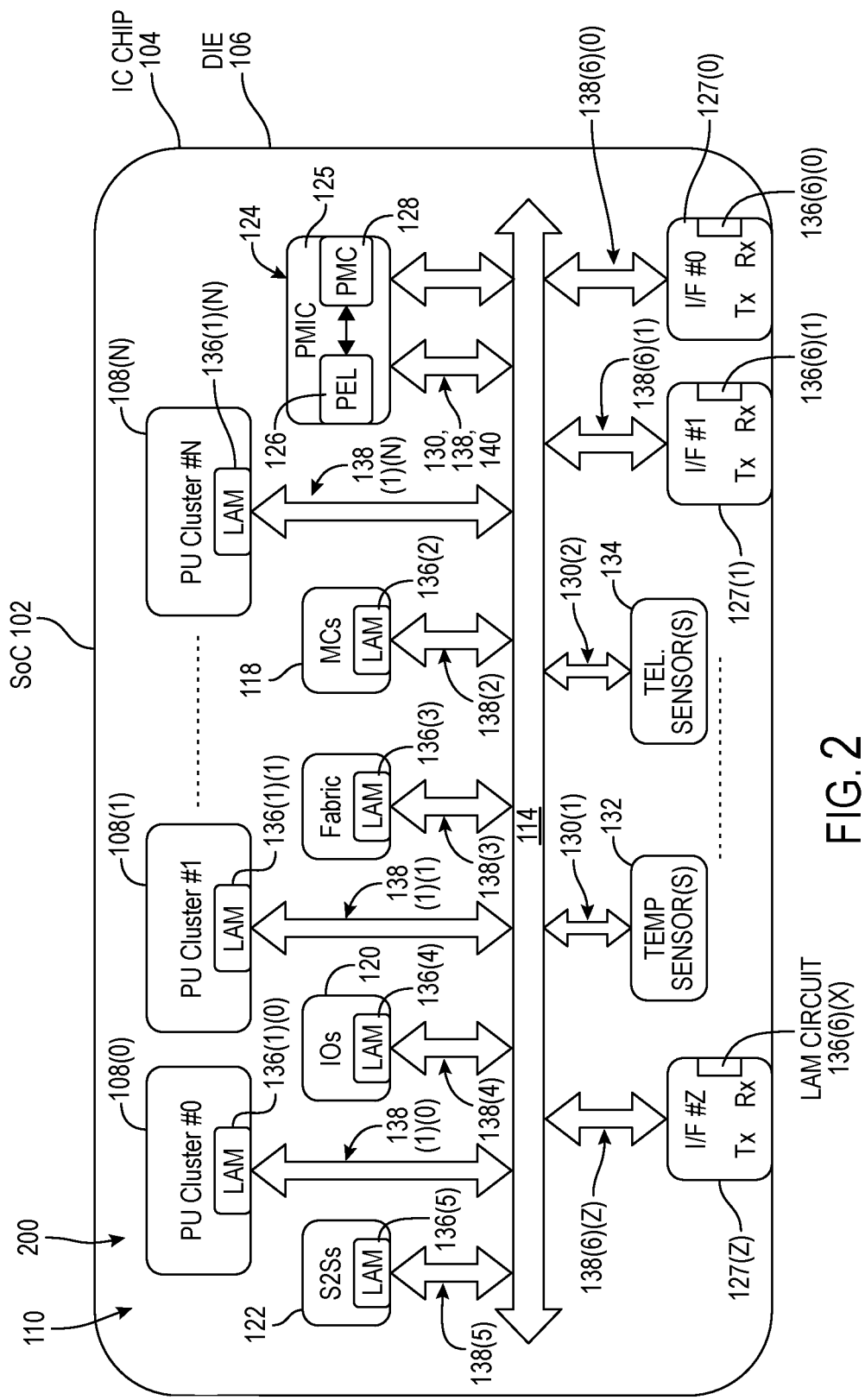
FIG. 2 is a logic diagram of the exemplary processor-based system in FIG. 1, illustrating processing circuits and other support devices communicatively coupled to an internal communication network and an optional hierarchical power management system that is configured to perform power estimation and throttling of power consumption.

FIG. 2 is a logic diagram of the exemplary processor-based system 100 in FIG. 1 illustrating processing devices 110 communicatively coupled to the internal communication network 114. A hierarchical power management system 124 to control power consumption in the IC chip 104 may be provided in accordance with aspects of the present disclosure. Common elements in the processor-based system 100 in FIGS. 1 and 2 are shown with common element numbers and thus are not re-described. The IC chip 104 can also include target devices 200, whose control also affects power, which can include the processing devices 110 and other circuits that are described below. As will be discussed in more detail below, the hierarchical power management system 124 may be configured to throttle power to target devices 200 as well as processing devices 110 to throttle power consumption in the IC chip 104.

As also shown in FIG. 2, the hierarchical power management system 124 may include a centralized power estimation and limiting (PEL) circuit 126 that is configured to estimate power consumption in the IC chip 104 and take actions to limit or throttle power consumption in the IC chip 104. In this example, the PEL circuit 126 can be provided as part of a power management integrated circuit (PMIC) 125 that is integrated into the IC chip 104. The PEL circuit 126 may communicate such power throttling requests to a power management controller (PMC) 128, which is configured to control power provided by voltage rails in the IC chip 104. Throttling power consumption can include both increasing power (e.g., increasing voltage to power rails) to increase power consumption for increased performance and decreasing power (e.g., decreasing voltage to power rails) to decrease power consumption. The hierarchical power management system 124 may be configured to estimate power consumption in the IC chip 104 through receipt of power events 130 reported to it from devices at lower hierarchical levels in the IC chip 104 that provide information that provides an indirect indication of power consumption. For example, the IC chip 104 may have one or more temperature sensor(s) 132 that are configured to report thermal power events 130(1) to the PEL circuit 126 to provide an indication of the temperature in the IC chip 104, which can then be correlated to power consumption by the processor-based system 100 in the IC chip 104. As another example, the IC chip 104 may have one or more telemetry sensor(s) 134 (e.g., current sensors) that are configured to detect and report telemetry power events 130(2) to the PEL circuit 126 to provide an indication of the telematics information in the IC chip 104 which can then also be correlated to power consumption by the processor-based system 100 in the IC chip 104.

The power consumption of the processing devices 110 in the processor-based system 100 may contribute to the power consumption in the IC chip 104. Thus, it may be desired to also have a way for the PEL circuit 126 in the hierarchical power management system 124 to receive a direct indication of power consumption for the processing devices 110. The PEL circuit 126 can then use this information to estimate power consumption in the IC chip 104 and use such information to appropriately throttle the power consumption in the IC chip 104. In this regard, as shown in FIG. 2, hierarchical power management system 124 may also include local area management (LAM) circuits 136 that are each associated with one or more processing devices 110 in the IC chip 104. The LAM circuits 136 could be placed in various places in the IC chip 104, including at corners of the IC chip 104, where power estimation and power limiting may need to be performed. For example, LAM circuits 136(1)(0)-136(1)(N) may be associated with one or more of the PU clusters 108(0)-108(N), as shown in FIG. 2. As another example, LAM circuits 136(2)-136(5), 136(6)(0)-136(6)(X) may also be associated with respective one or more of the memory controllers 118, the internal communication network 114, e.g., the fabric, one or more of the I/O interface circuits 120, the one or more of the S2S interface circuits 122, and/or one or more interface circuits 127(0)-127(Z). Each LAM circuit 136(2)-136(5), 136(6)(0)-136(6)(X) is configured to monitor the activity related to its associated processing device 110 as a monitored processing device 110 to then generate respective activity power events 138(1)(0)-138(1)(N), 138(2)-138(5), 138(6)(0)-138(6)(Z) (referred to herein individually, partially, or collectively as "activity power events 138") that are communicated directly or indirectly to the PEL circuit 126. The activity power events 138(1)(0)-138(1)(N), 138(2)-138(5), 138(6)(0)-138(6)(Z) contain information that relates to the power consumption of the respective monitored processing device 110. For example, the activity power events 138(1)(0)-138(1)(N), 138(2)-138(5), 138(6)(0)-138(6)(Z) could contain processing activity information, or power consumption information that is generated by the respective LAM circuits 136(1)(0)-136(1)(N), 136(2)-136(5), 136(6)(0)-136(6)(X) estimating power consumption of its monitored processing device 110 based on processing activity of its monitored processing device 110.

In either case, in this manner, the activity power events 138 can be reported from local areas in the IC chip 104, where power estimations for particular monitored processing devices 110 are performed, to the centralized PEL circuit 126. The PEL circuit 126 can then be configured to use the received activity power events 138 and/or the other power events 130 to estimate and control (i.e., throttle) power in the processor-based system 100 in the IC chip 104 to achieve a desired performance within an overall power budget for the IC chip 104. For example, the activity power events 138 that are associated with estimations of power consumption of processing devices 110 that can be thought of in essence as power throttle recommendations to the PEL circuit 126 for the PEL circuit 126 to throttle power in the IC chip 104 if the estimated power consumption exceeds the power limits of the IC chip 104 or negatively affects performance in an undesired manner.

The PEL circuit 126 being configured to receive activity power events 138 relating to activity for individual processing devices 110 in the processor-based system 100 allows the PEL circuit 126 to throttle power consumption to certain local processing devices 110 that are responsible for increased power consumption. This allows the PEL circuit 126 to throttle power with discrimination as opposed to throttling power to the power rails or, in other ways, in the IC chip 104 that affects the power delivered to a larger set of processing devices 110 as a whole. For example, as discussed in more detail below, the PEL circuit 126 can be configured to use the received activity power events 138 to perform performance throttling of processing devices 110 in the processor-based system 100 to throttle its power consumption. The PEL circuit 126 can be configured to generate power limiting management responses 140 to be communicated to certain LAM circuits 136 in the processor-based system 100 to cause such LAM circuits 136 to limit the performance of its monitored processing device 110.

Performance throttling of a processing device 110 in the processor-based system 100 to throttle its power consumption can be accomplished in different manners. For example, as discussed in more detail below, performance throttling can be achieved by the PEL circuit 126 by generating a throughput throttling power limiting management response 140, which is destined for the LAM circuit 136(3) associated with the internal communication network 114. The LAM circuit 136(3) can be configured to throttle the throughput of communication traffic in the internal communication network 114, such as at a particular network node in the internal communication network 114, to throttle current demand in the internal communication network 114 and thus its power consumption. Throughput throttling can be isolated to only certain areas or network nodes in the internal communication network 114. In another example, as discussed in more detail below, performance throttling in the processor-based system 100 can be achieved by the PEL circuit 126 by generating a clock throttling power limiting management response 140 to cause a clock circuit (which may be clocking one or more of the processing devices 110) to throttle the speed (i.e., clock frequency) of certain clocked processing devices 110. Clock throttling of a processing device 110 throttles its current demand, which throttles its power consumption. In another example, as discussed in more detail below, performance throttling in the processor-based system 100 can be achieved by throttling or changing the power states of a monitored processing device 110 to throttle its performance and thus its power consumption.

Figure 3:
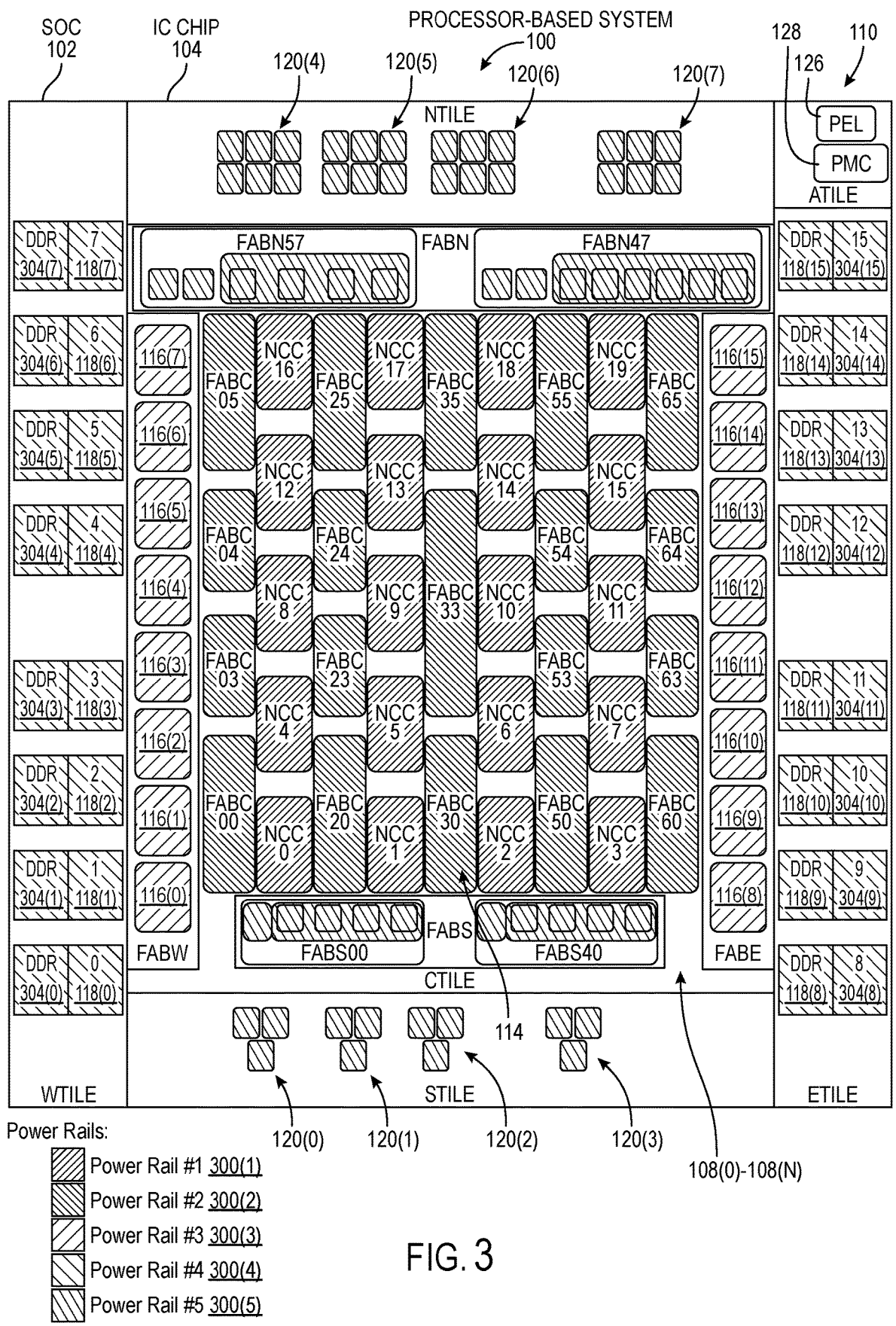
FIG. 3 is a top view of an exemplary physical layout of the semiconductor die ("die") that is an SoC in an IC chip of the processor-based system in FIG. 1 illustrating the physical layout of different tile regions and the devices physically present in such different tile regions, and coded with indicia indicating the separate power rails from which devices are supplied with power from the hierarchical power management system.

FIG. 3 is a top view of an exemplary physical layout of the semiconductor die ("die") 106 of the IC chip 104 in FIG. 1 that includes the processor-based system 100 to illustrate further exemplary details of the physical layout of a hierarchical power management system 124 and an exemplary organization of power rails provided in the processor-based system 100.

As shown in FIG. 3, the IC chip 104 has a physical layout that includes a center tile CTILE, a west tile WTILE, an east tile ETILE, a south tile STILE, a north tile NTILE, and an A-tile ATILE. A tile is a smaller section of a semiconductor die that has been processed in a wafer process and contains a set of IC components. The center tile CTILE in this example includes the PU clusters 108(0)-108(N), shown as NCC0-NCC19. Different numbers of processor cores can be provided in different PU clusters 108(0)-108(N), NCC0-NCC19. In this example, the PU clusters 108(0)-108(N), NCC0-NCC19 are all powered by a same power rail 300(1). The center tile CTILE in this example also includes the internal communication network 114, which is shown by a plurality of center network nodes FABC00-FABC65. The network nodes FABC00-FABC65 are circuits that create a network fabric ("fabric") of communication paths between the different PU clusters 108(0)-108(N) and the supporting processing devices 110. In this example, the network nodes FABC00-FABC65 are powered by a second power rail 300(2). The network nodes FABC00-FABC65 are circuits that can include interconnected switches and/or routers that provide a reliable network fabric that provides and receives data on the internal communications network 114 between different PU clusters 108(0)-108(N) and the supporting processing devices 110. The center tile CTILE in this example also includes the system level cache memory 116(0)-116(7) powered by a third power rail 300(3) to provide shared cache memory 116 for the PU clusters 108(0)-108(N), NCC0-NCC19. The system level cache memory 116(0)-116(7) that is organized into different quadrants adjacent to and coupled to respective memory circuits DDR0-DDR7 that include respective memory controllers 118(0)-118(7) and memory 304(0)-304(7) (e.g., dynamic data random access memory (DDR) circuits) in the west tile WTILE to provide interlacing memory schemes for example. The memory circuits DDR0-DDR7 may be powered by yet a separate, fourth power rail 300(4). The memory circuits DDR0-DDR7 are also communicatively coupled to the internal communication network 114 through the respective network nodes FABC00-FABC05.

With continuing reference to FIG. 3, the center tile CTILE in this example also includes the system level cache memory 116(8)-116(15), also powered by the third power rail 300(3), to provide additional shared cache memory 116 for the PU clusters 108(0)-108(N), NCC0-NCC19. The system level cache memory 116(8)-116(15) may be organized into different quadrants adjacent to respective memory circuits DDR8-DDR15 that include respective memory controllers 118(8)-118(15) and coupled memory 304(8)-304(15) (e.g., DDR circuits) in the east tile ETILE to provide interlacing memory schemes for example. The memory circuits DDR8-DDR15 are also shown as being powered by the same fourth power rail 300(4) as is powering the memory circuits DDR0-DDR7 in the west tile WTILE. The memory circuits DDR8-DDR15 are also communicatively coupled to the internal communication network 114 through the respective network nodes FABC60-FABC65.

With continuing reference to FIG. 3, the center tile CTILE of the IC chip 104 in this example includes request node circuits FABS00, FABS40, FABN57, FABN47 that are coupled to the internal communication network 114 to provide network interfaces between the I/O interface circuits 120(0)-120(3), 120(4)-120(7) and the internal communication network 114 in the respective south tile STILE and north tile NTILE. The request node circuits FABS00, FABS40, FABN57, FABN47 manage the traffic requests from the I/O interface circuits 120(0)-120(3), 120(4)-120(7) to the internal communication network 114 and vice versa. The request node circuits FABS00, FABS40, FABN57, FABN47 and the I/O interface circuits 120(0)-120(3), 120(4)-120(7) in this example are powered by a fifth power rail 300(5).

With continuing reference to FIG. 3, the A-tile ATILE in the IC chip 104 includes the PEL circuit 126 and the PMC 128 of the hierarchical power management system 124 in this example.

Thus, as shown in FIG. 3, the processing devices 110 in the processor-based system 100 in the IC chip 104 are powered by a series of different power rails 300(1)-300(5). Thus, the PEL circuit 126 in the hierarchical power management system 124 has the resolution of each of these different power rails 300(1)-300(5) in which to vary the voltage on such power rails 300(1)-300(5) to throttle power consumption in the IC chip 104 based on the activity power events 130, 138. Note that each power rail 300(1)-300(5) can actually be included as a single or multiple power rails.

Figure 4:
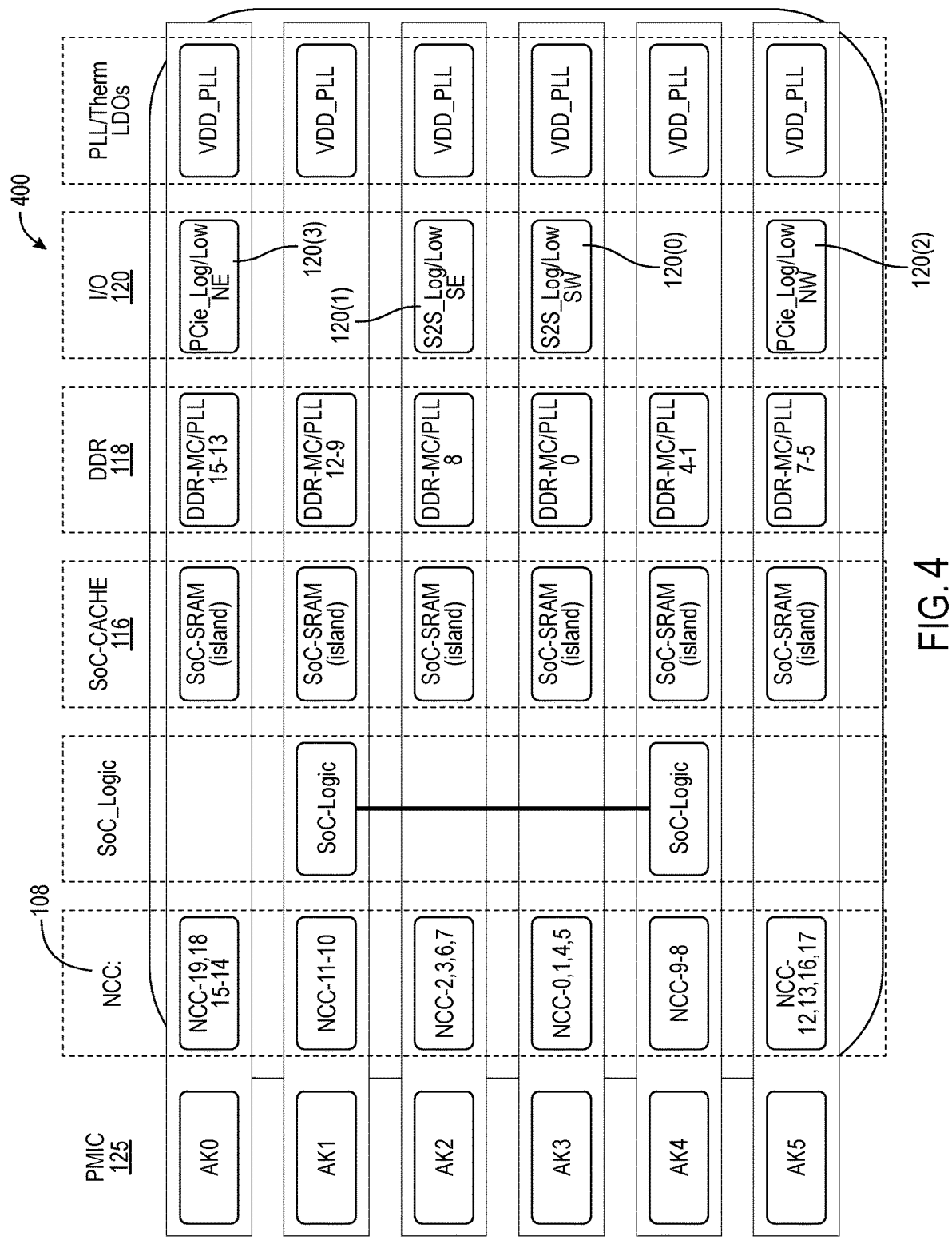
FIG. 4 is a table illustrating an exemplary assignment of power rails driven by respective power management ICs (PMIC), in the processor-based system in FIG. 1, to devices in the processor-based system for supplying power to such devices.

FIG. 4 is a table 400 illustrating an exemplary assignment of power management circuits AK0-AK5 in the PMIC 125 in the processor-based system 100 to devices in the processor-based system 100 for supplying power to such devices. Power management circuits AK0-AK5 can be responsible for controlling one or more different power rails 300(1)-300(5), as shown in FIG. 3, to supply power to various components. Multiple devices in the processor-based system 100 can be coupled to the same power rail 300(1)-300(5) to receive power. For example, as shown in FIG. 4, in this example, PU clusters NCC19, 18, 15, 14 are powered from power rails controlled by power management circuit AK0, PU clusters NCC 11-10 are powered from power rails controlled by power management circuit AK1, PU clusters NCC2, 3, 6, 7 are powered from power rails controlled by power management circuit AK2, PU clusters NCC0, 1, 4, 5 are powered from power rails controlled by power management circuit AK3, PU clusters NCC9-8 are powered from power rails controlled by power management circuit AK4, and PU clusters NCC12, 13, 16, 17 are powered from power rails controlled by power management circuit AK5. Also, as shown in FIG. 4, a single device in the processor-based system 100 can be coupled to more than one power rail to receive power. For example, power supplied to the logic circuits (SoC_Logic) can be controlled by the multiple power management circuits AK1-AK4. The cache memory 116 can be supplied power from power rails controlled by the power management circuits AK0-AK5. Different memory controllers 118 are shown as being powered by power rails controlled by the power management circuits AK0-AK5. The I/O interface circuits 120(0)-120(3) are shown as being powered by power rails controlled by separate respective power management circuits AK3, AK2, AK5, AK0.

Figure 5:
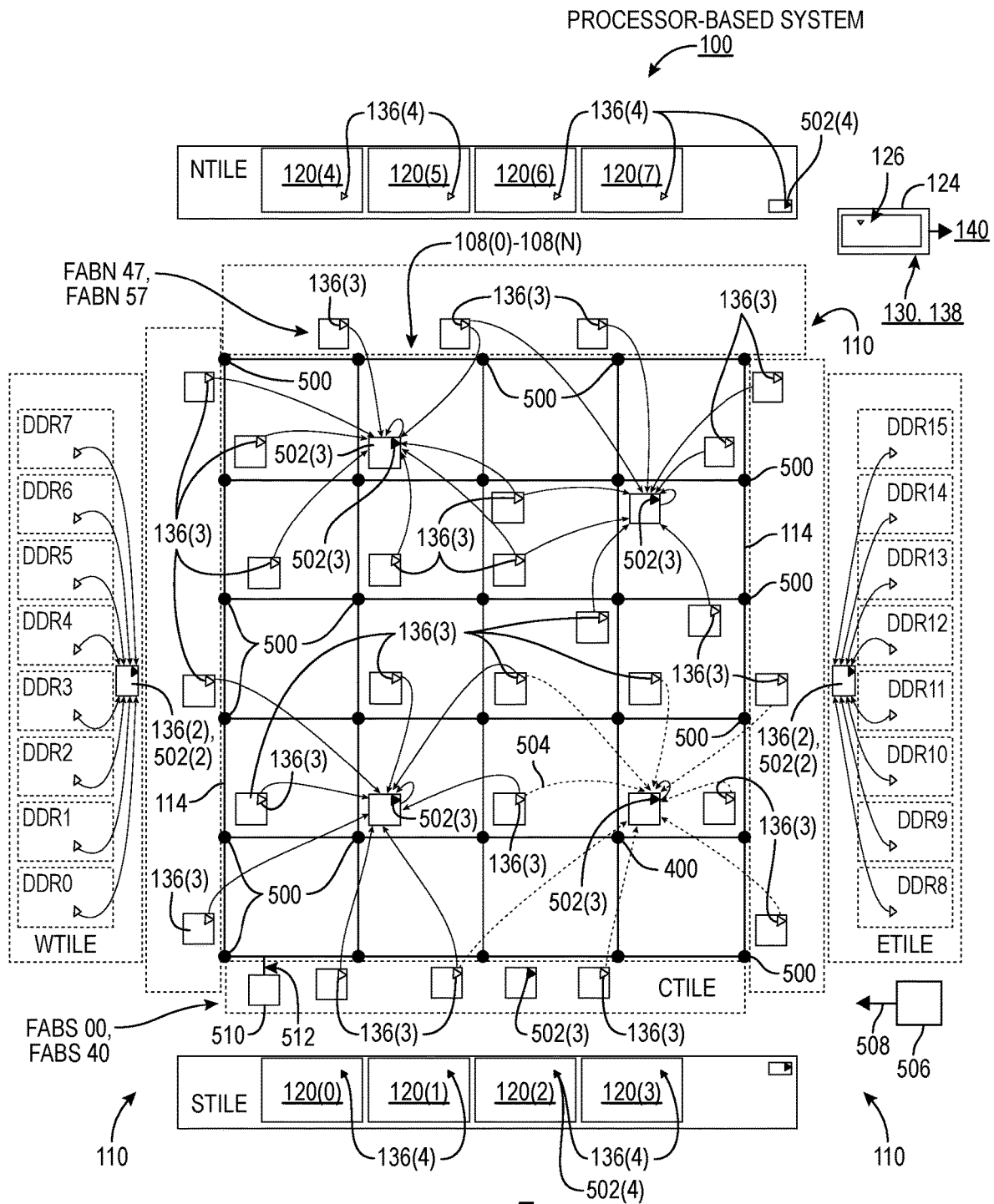
FIG. 5 is another top view of the processor-based system in the IC chip in FIG. 1, illustrating local area management (LAM) circuits, regional activity management (RAM) circuits, and a power estimation and limiting (PEL) circuit as part of a hierarchical power management system, wherein the hierarchical power management system is configured to locally monitor the activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response.

FIG. 5 is another top view of the processor-based system 100 in the IC chip 104 in FIG. 1, illustrating local area management (LAM) circuits 136 and the PEL circuit 126 as part of the hierarchical power management system 124. As discussed above with regard to FIG. 2, the LAM circuits 136 can be configured to locally monitor activity of processing devices 110, such as the PU clusters 108(0)-108(N) in the processor-based system 100 to estimate and throttle its power consumption and report activity power events 138 regarding estimated power consumption to the PEL circuit 126. The processor-based system 100 in this example includes a clock circuit 506 that generates a clock signal 508 to clock the PU clusters 108(0)-108(N) to control the speed of the PU clusters 108(0)-108(N). The PEL circuit 126 is configured to collect activity power events 138 regarding power consumption of the monitored processing devices 110 and issue power limiting management responses 140 in response to throttle power consumption in the IC chip 104.

As shown in FIG. 5, a plurality of LAM circuits 136(3) are distributed in the center tile CTILE and associated with respective network node 500 (as processing devices 110) of the internal communication network 114. For example, the internal communication network 114 can be a mesh network, as shown in FIG. 5. The internal communication network 114 is capable of routing communication traffic from the PU clusters 108(0)-108(N) through different network nodes 500 based on performance and traffic characteristics of the internal communication network 114. In this manner, the throughput of the internal communication network 114 is not limited by any single network node 500. The processor-based system 100 in this example includes a clock circuit 510 that generates a clock signal 512 to clock the network nodes 500 to control the speed of the internal communication network 114. The clock circuit 510 is another example of a target device 200 in the IC chip 104. As will be discussed in more detail below, the LAM circuits 136(3) associated with the network nodes 500 in the internal communication network 114 are configured to sample the processing activity of respectively assigned network nodes 500 to generate a plurality of activity samples. The LAM circuits 136(3) are then configured to estimate the power consumption of the assigned network node 500 based on the activity samples regarding its assigned network node 500 to generate an activity power event 138 based on the such estimated power consumption of the respective network node 500.

Also, as shown in FIG. 5, in this example, the hierarchical power management system 124 may also include regional activity management (RAM) circuits 502(3) configured to monitor activity of the internal communication network 114. The RAM circuits 502(3) can be located in a particular region of the internal communication network 114, with each being assigned and coupled to a subset of the LAM circuits 136(3). The RAM circuits 502(3) can be intermediate power management circuits in the hierarchical power management system 124. The RAM circuits 502(3) may be coupled to the PEL circuit 126 through a second communication network 504. The RAM circuits 502(3) can be communicatively and hierarchically located between the LAM circuits 136(3) and the centralized PEL circuit 126. In some examples, the RAM circuits 502(3) are configured to receive and aggregate activity power events 138 reported by assigned LAM circuits 136(3) regarding activity of their monitored network node 500. The RAM circuits 502(3) can then aggregate these activity power events 138 and report an aggregated activity power event to the PEL circuit 126 so that the PEL circuit 126 can determine how the power consumption of network nodes 500 should be throttled to achieve a desired overall performance of the internal communication network 114 while also maintaining power consumption within desired limits. The PEL circuit 126 can communicate a power limiting management response 140 back to a given RAM circuit 502(3) to perform throughput throttling of a given network node(s) 500 in response to the power consumption of a network node(s) 500 being determined to exceed desired limits. For example, as discussed in more detail below, the RAM circuit 502(3) can be configured to throttle throughput of a given network node(s) 500 by selectively enabling and disabling communication traffic through the network node(s) 500.

Also, as shown in FIG. 5, in this example, a plurality of LAM circuits 136(2) are distributed in the west tile WTILE and the east tile ETILE and associated with respective memory circuits DDR0-DDR7, DDR8-DDR15 (as processing devices 110). As will also be discussed in more detail below, the LAM circuits 136(2) associated with the memory circuits DDR0-DDR7, DDR8-DDR15 are configured to sample processing activity of respectively assigned memory circuits DDR0-DDR7, DDR8-DDR15 to generate a plurality of activity samples. The LAM circuits 136(2) are then configured to estimate the power consumption of the assigned memory circuit DDR0-DDR7, DDR8-DDR15 based on the activity samples regarding their assigned network node 500 to generate an activity power event 138 based on the such estimated power consumption of the respective memory circuits DDR0-DDR7, DDR8-DDR15.

Also, as shown in FIG. 5, in this example, the hierarchical power management system 124 also includes regional RAM circuits 502(2) configured to monitor activity of the memory circuits DDR0-DDR7, DDR8-DDR15. The RAM circuits 502(2) are located in a particular region of the memory circuits DDR0-DDR7, DDR8-DDR15, with each being assigned and coupled to a subset of the LAM circuits 136(2). The RAM circuits 502(2) are communicatively and hierarchically located between the LAM circuits 136(2) and the centralized PEL circuit 126. The RAM circuits 502(2) are coupled to the PEL circuit 126 through the second communication network 504. The RAM circuits 502(2) are configured to receive and aggregate activity power events 138 reported by assigned LAM circuits 136(2) regarding activity of their monitored memory circuits DDR0-DDR7, DDR8-DDR15. The RAM circuits 502(2) can then aggregate these activity power events 138 and report an aggregated activity power event to the PEL circuit 126 so that the PEL circuit 126 can determine how power consumption of the memory circuits DDR0-DDR7, DDR8-DDR15 should be throttled to achieve a desired overall performance of the memory circuits DDR0-DDR7, DDR8-DDR15 while also maintaining power consumption within desired limits. The PEL circuit 126 can communicate a power limiting management response 140 back to a given RAM circuit 502(2) to perform throughput and/or performance throttling of a given memory circuit(s) DDR0-DDR7, DDR8-DDR15 in response to the power consumption of a memory circuit DDR0-DDR7, DDR8-DDR15 being determined to exceed desired limits. For example, as discussed in more detail below, the RAM circuit 502(2) can be configured to throttle throughput and/or performance of a given memory circuit(s) DDR0-DDR7, DDR8-DDR15 by selectively enabling and disabling memory access requests/responses to the memory circuits DDR0-DDR7, DDR8-DDR15.

Also, as shown in FIG. 5, in this example, the hierarchical power management system 124 also includes regional RAM circuits 502(4) configured to monitor activity of the I/O interface circuits 120(0)-120(7). The RAM circuits 502(4) are located in a particular region of the I/O interface circuits 120(0)-120(7), with each being assigned and coupled to a subset of the LAM circuits 136(4) as shown. The RAM circuits 502(4) are communicatively and hierarchically located between the LAM circuits 136(4) and the centralized PEL circuit 126. The RAM circuits 502(4) are coupled to the PEL circuit 126 through the second communication network 504. The RAM circuits 502(4) are configured to receive and aggregate activity power events 138 reported by assigned LAM circuits 136(4) regarding activity of their monitored I/O interface circuits 120(0)-120(7). The RAM circuits 502(4) can then aggregate these activity power events 138 and report an aggregated activity power event to the PEL circuit 126 so that the PEL circuit 126 can determine how power consumption of the I/O interface circuits 120(0)-120(7) should be throttled to achieve a desired overall performance of the I/O interface circuits 120(0)-120(7) while also maintaining power consumption within desired limits. The PEL circuit 126 can communicate a power limiting management response 140 back to a given RAM circuit 502(4) to perform throughput and/or performance throttling of a given I/O interface circuit(s) 120(0)-120(7) in response to the power consumption of an I/O interface circuit(s) 120(0)-120(7) being determined to exceed desired limits. For example, as discussed in more detail below, the RAM circuit 502(4) can be configured to throttle throughput and/or performance of a given I/O interface circuit(s) 120(0)-120(7) by selectively enabling and disabling access requests/responses to the I/O interface circuit(s) 120(0)-120(7).

As shown back in FIG. 2, LAM circuits 136(1)(0)-136(1)(N) can also be associated with each PU cluster 108(0)-108(N) in the processor-based system 100 to sample activity therein to estimate power consumption in a respective PU cluster 108(0)-108(N). The LAM circuits 136(1)(0)-136(1)(N) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(1)(0)-136(1)(N) are coupled to the PEL circuit 126 through the second communication network 504. The PEL circuit 126 can generate power-limiting management responses 140 in response to throttle the performance of the PU clusters 108(0)-108(N).

As also shown in FIG. 2, LAM circuits 136(5) can also be associated with each S2S interface circuit 122(0)-122(Y) in the processor-based system 100 to sample activity therein to estimate power consumption in a respective S2S interface circuit 122(0)-122(Y). The LAM circuits 136(5) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(5) are coupled to the PEL circuit 126 through the second communication network 504. In response, the PEL circuit 126 can generate power-limiting management responses 140 to throttle the performance of the S2S interface circuits 122(0)-122(Y).

As shown back in FIG. 2, LAM circuits 136(6)(0)-136(6)(X) can also be associated with each interface circuit 127(0)-127(Z) in the processor-based system 100 to sample activity therein to estimate power consumption in a respective interface circuit 127(0)-127(Z). The LAM circuits 136(6)(0)-136(6)(X) can be configured to generate activity power events 138 that include the estimated power consumptions in response to a RAM circuit 502, which in turn aggregates such activity power events 138 to the PEL circuit 126. The RAM circuits 502 assigned to a subset of LAM circuits 136(6)(0)-136(6)(X), is coupled to the PEL circuit 126 through the second communication network 504. The PEL circuit 126 can generate power limiting management responses 140 in response to throttle the performance of the interface circuits 127(0)-127(Z).

In this example, any of the RAM circuits 502, 502(2)-502(4) discussed above can also include circuitry to behave functionally as a LAM circuit for an assigned processing device 110. In this regard, any of the RAM circuits 502, 502(2)-502(4) can also be configured to sample the processing activity of its respective assigned processing device 110 to generate a plurality of activity samples for such processing device 110. Such RAM circuits 502, 502(2)-502(4) can be configured to estimate the power consumption of its assigned processing device 110 based on the activity samples regarding its assigned processing device 110 to generate an aggregated activity power event based on the such estimated power consumption of the respective processing device 110 and the other received activity power events 138 from its coupled LAM circuits 136(1)(0)-(1)(N), 136(2)-136(5), 136(6)(0)-136(6)(X).

Note that in any of the above-referenced examples, the RAM circuits 502 are optional for any of the monitored processing devices 110, and their respective LAM circuits 136(1)-136(6) can be configured to communicate activity power events 138 directly to the PEL circuit 126.

Figure 6:
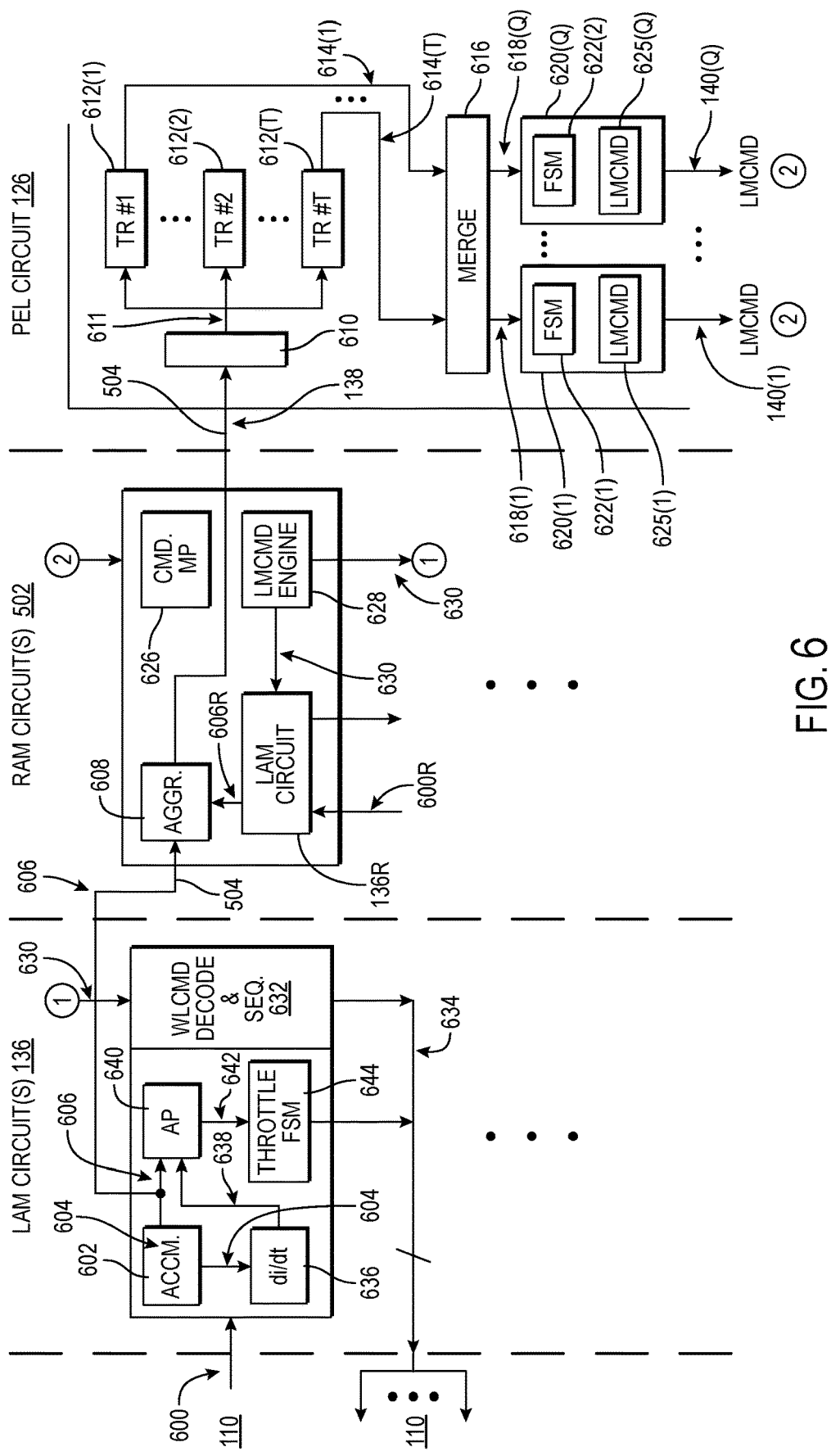
FIG. 6 is a schematic diagram of an exemplary three (3) level hierarchical power management system that can be provided in the processor-based system in the IC chip in FIG. 1, wherein the three (3) level hierarchical power management system may include: a first, local level of LAM circuits configured to perform local device monitoring and power consumption throttling, and report activity power events regarding monitored processing device power consumption, a second, intermediate level of RAM circuits configured to receive and aggregate local activity power events, and a third, centralized level of a PEL circuit configured to collect aggregated activity power events regarding power consumption of the monitored processing devices and throttle power in the IC chip in response.

FIG. 6 is a schematic diagram illustrating additional exemplary detail of a three (3) level hierarchical power management system 624 that can be provided as the hierarchical power management system 124 in the processor-based system 100 in the IC chip 104 in FIGS. 1-3 and 5. Common elements between the hierarchical power management system 624 in FIG. 6 and the hierarchical power management system 124 in FIGS. 1-3 and 5 are shown with common element numbers. In this regard, FIG. 6 illustrates a single LAM circuit 136 communicatively coupled to a single RAM circuit 502 which is coupled to the PEL circuit 126. Note, however, that this is to simplify the illustration in FIG. 6. In the hierarchical power management system 624 in FIG. 6, there can be a plurality of RAM circuits 502 that are communicatively coupled to the PEL circuit 126. There can also be a plurality of LAM circuits 136 that are communicatively coupled to each RAM circuit 502 of the plurality of RAM circuits 502. The discussion below regarding the exemplary operation of the LAM circuit 136 and RAM circuit 502 are equally applicable to any number of LAM circuits 136 and RAM circuits 502 included in the processor-based system, including the LAM circuits 136(1)(0)-(1)(N), 136(2)-136(5), 136(6)(1)-136(6)(X) and the RAM circuits 502, 502(2)-502(4).

With reference to FIG. 6, the LAM circuit 136 in this example is configured to sample the processing activity as a received activity sample 600 of an assigned, monitored processing device 110 in each cycle of a given local time window. The LAM circuit 136 periodically samples activity of its monitored processing device 110 in a local time window representing the activity of the assigned, monitored processing device 110 in that local time window. In this example, the LAM circuit 136 is configured to correlate received activity samples 600 into a power consumption during a given local time window for the activity of the processing device 110 for that given local time window. The LAM circuit 136 includes an accumulate circuit 602 that is configured to accumulate the estimated power consumptions based on the received activity samples 600 sampled in a given local time window to generate an estimated current demand 604 for the monitored processing device 110 for the local time window. The estimated current demand 604 is an estimate of the accumulated current measurement reported by the assigned processing device 110 (i.e., power consumption) over the local time window. The accumulate circuit 602 may then provide the estimated current demand 604 (current demand over time) for each local time window in a generated activity power event 606 on the second communication network 504, representing the estimated power consumption of the monitored processing device 110 that is communicated to the RAM circuit 502 assigned to the LAM circuit 136. The accumulate circuit 602 may repeat the same process for subsequent local time windows to accumulate the estimated power consumptions for received activity samples 600 during the local time window to generate a next estimated current demand 604 for the monitored processing device 110.

With continuing reference to FIG. 6, the RAM circuit 502 may include an aggregation circuit 608 that is configured to aggregate the received activity power events 606 from its coupled LAM circuits 136 into a generated aggregated activity power event 138. The RAM circuit 502 may then be configured to communicate the aggregated activity power event 138 on the second communication network 504 to the PEL circuit 126. Note that in this example, the RAM circuit 502 also includes its own LAM circuit 136R that may be configured like the LAM circuit 136 in FIG. 6. In this regard, the LAM circuit 136R may be configured to sample the processing activity 600R of an assigned processing device 110 into a plurality of activity samples 600R. The processing activity 600R of the assigned processing device 110 may be sampled periodically by the LAM circuit 136R to generate a plurality of activity samples over a given local time window representing the activity of the assigned, monitored processing device 110. The LAM circuit 136R is configured to determine a current flow rate and/or a change in the current flow rate (i.e., di/dt) of current provided to the assigned processing device 110 and represented by the received plurality of activity samples 600. The LAM circuit 136R can be programmed to correlate processing activity to power consumption to estimate the power consumption of the monitored processing device 110 over the local time window. The LAM circuit 136R can then be configured to generate an activity power event 606 representing the estimated power consumption of the monitored processing device 110 that is communicated to the aggregation circuit 608 of the RAM circuit 502 to be aggregated into the aggregated activity power event 138.

With continuing reference to FIG. 6, the PEL circuit 126 may be configured to receive the aggregated activity power events 138 from the one or more RAM circuits 502 included in the hierarchical power management system 624. In this example, the PEL circuit 126 includes a decode circuit 610 that is configured to decode the received aggregated activity power events 138 into decoded activity power events 611 to be routed to a corresponding activity tracker circuit 612(1)-612(T) that are each associated with a monitored processing device 110 in the processor-based system 100. The PEL circuit 126 can also include other energy tracker circuits (not shown) that are associated with other power events (e.g., temperature, droop detection) that can also affect how the PEL circuit 126 decides to throttle power. The activity tracker circuits 612(1)-612(T) may be configured to aggregate associated activity power events 138 for an assigned monitored processing device 110 to determine whether power consumption for a monitored processing device 110 exceeds a defined threshold current flow rate/change in current flow rate (di/dt). The activity tracker circuits 612(1)-612(T) can also each include a power limit management policy that can be configured to generate respective power throttle recommendations 614(1)-614(T) for the PEL circuit 126 to use to determine how to throttle the distributed power and/or performance of the monitored processing devices 110 to throttle power consumption.

With continuing reference to FIG. 6, the PEL circuit 126 also includes a merge circuit 616 that merges the power throttle recommendations 614(1)-614(T) for the individual monitored processing devices 110 into merged power throttle recommendations 618(1)-618(Q). The merged power throttle recommendations 618(1)-618(Q) are provided to respective assigned target circuits 620(1)-620(Q). Each target circuit 620(1)-620(Q) is associated with a different target device 200 in the processor-based system 100 in which the PEL circuit 126 can issue power limiting management responses 140(1)-140(Q) to limit the power consumption of such target device 200. The target devices 200 are devices in the IC chip 104 whose operational control (e.g., operating voltage, frequency, workload) can affect power consumption in the IC chip 104. The target devices in the IC chip 104 can include more than just the processing devices 110 in the processor-based system 100. For example, the target devices 200 can include the power rails 300(1)-300(5), as shown in FIG. 3 and/or any of the processing devices 110 in the processor-based system 100. The PEL circuit 126 can be programmed to map (e.g., through firmware, electronic fuses, etc.) the merged power throttle recommendations 618(1)-618(Q) to a particular target device 200, and thus a target circuit 620(1)-620(Q), that may not directly correlate to each other. For example, it may be desired for the PEL circuit 126 to throttle power consumption of the I/O interface circuits 120(0)-120(X) by not only throttling power consumption for the I/O interface circuits 120(0)-120(X) but also by throttling power of the PU clusters 108(0)-108(N) that may be contributing to the power consumption by the I/O interface circuits 120(0)-120 (X). In this manner, the merged power throttle recommendations 618(1)-618(Q) and/or other power events related to power issues and power consumption in the IC chip 104 can be mapped in the PEL circuit 126 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 126 can be configured and changed even after the IC chip 104 is deployed in an application.

With continuing reference to FIG. 6, the target circuits 620(1)-620(Q) may each be configured to determine if the power consumption of an associated target device 200 in the processor-based system 100 should be throttled based on the merged power throttle recommendations 618(1)-618(Q) provided to the target circuits 620(1)-620(Q). The target circuits 620(1)-620(Q) can each include finite state machine (FSM) circuits 622(1)-622(Q) that are configured to analyze the respective received merged power throttle recommendation 618(1)-618(Q) to determine if the power consumption of an associated target device 200 should be throttled. If an FSM circuit 622(1)-622(Q) determines that the power consumption of an associated target device 200 in the processor-based system 100 should be throttled, the FSM circuit 622(1)-622(Q) causes an associated power limiting command generation circuit 625(1)-625(Q) to generate a power limiting management response 140(1)-140(Q) to cause the power consumption of a target device 200 associated with the power limiting management response 140 (1)-140(Q) to limit power consumption.

For example, if the target circuit 620(1)-620(Q) is assigned to a target device 200 of a power rail 300(1)-300 (5), the target circuit 620(1)-620(Q) can be configured to determine how to throttle the voltage to the associated power rail 300(1)-300(5) to control power consumption of processing devices 110 powered by such power rail 300(1)-300(5). The respective power limiting command generation circuit 625(1)-625(Q) can be configured to generate a performance throttling power limiting management response 140(1)-140 (Q) to cause the voltage provided to the associated power rail 300(1)-300(5) to be throttled to control power consumption of processing devices 110 powered by such associated power rail 300(1)-300(5).

In another example, if the target circuit 620(1)-620(Q) is assigned to a target device 200, such as the internal communication network 114, the target circuit 620(1)-620(Q) can be configured to determine how to throttle performance of the internal communication network 114 to control power consumption of the internal communication network 114. For example, to throttle the throughput performance of the internal communication network 114, the target device 200 may be the clock circuit 506 (FIG. 5) that is configured to clock the internal communication network 114. The clock circuit 506 is another example of a target device 200 in the IC chip 104. The target circuit 620(1)-620(Q) can determine a throttle frequency of the clock signal 508 generated by the clock circuit 506 (FIG. 5) for generating a clock throttling power limiting management response 140(1)-140(Q). The clock throttling power limiting management response 140 (1)-140(Q) may cause the clock signal 508 to be throttled, which will, in turn, throttle the speed and the throughput performance of the internal communication network 114 and thus its power consumption and/or other circuits clocked by the clock signal 508.

In another example, if the target circuit 620(1)-620(Q) is assigned to a target device 200 as a PU cluster 108(0)-108 (N) or any other processing device 110, the target circuit 620(1)-620(Q) can be configured to determine how to throttle performance of the internal communication network 114 to control power consumption of the internal communication network 114. For example, to throttle performance of the PU cluster 108(0)-108(N) or other processing device 110, the target device 200 may be the clock circuit 506 (FIG. 5) that is configured to clock the PU clusters 108(0)-108(N). The target circuit 620(1)-620(Q) can determine a throttle frequency of the clock signal 508 generated by the clock circuit 506 for generating a performance power limiting management response 140(1)-140(Q). The clock throttling power limiting management response 140(1)-140(Q) will cause the clock signal 508 to be throttled, which will, in turn, throttle the performance of the PU clusters 108(0)-108(N) or other processing devices 110.

As shown in FIG. 6, in this example, to communicate the power limiting management responses 140(1)-140(Q) generated by the PEL circuit 126 to affect a power throttling of a target device 200 in the processor-based system 100, the power limiting management responses 140(1)-140(Q) are communicated to a target device 200 in the processor-based system 100. For target devices 200 that are monitored processing devices 110 monitored by a LAM circuit 136 or RAM circuit 502, the PEL circuit 126 can be configured to communicate an associated power limiting management response 140(1)-140(Q) to the RAM circuit 502. The RAM circuit 502 in this example includes a command processor 626 that is configured to receive a power limiting management response 140(1)-140(Q) to process the power limiting management response 140(1)-140(Q) to identify the LAM circuit 136 to communicate with to effectuate the power throttling requested in the received power limiting management response 140(1)-140(Q). In this example, the RAM circuit 502 includes a limiting command engine circuit 628 that is configured to generate a local power limiting management response 630 directed to the LAM circuit 136 that can effectuate the power throttling requested in the received power limiting management response 140(1)-140(Q). Note that if the local power limiting management response 630 is to throttle power consumption of multiple processing devices 110 monitored by multiple LAM circuits 136 associated with the RAM circuit 502, the limiting command engine circuit 628 can address the local power limiting management response 630 to multiple LAM circuits 136. Also note that in this example, if the RAM circuit 502 includes the LAM circuit 136R, and the RAM circuit 502 is monitoring a processing device 110 that is the target device 200 to be throttled, the limiting command engine circuit 628 generates the local power limiting management response 630 directed to the LAM circuit 136R.

With continuing reference to FIG. 6, in response to a LAM circuit 136 receiving a local power limiting management response 630, a power limiting management decode and sequencer circuit 632 may process the received local power limiting management response 630. The power limiting management decode and sequencer circuit 632 may be configured to determine a power throttling response to be effectuated to a monitored processing device 110 based on the local power limiting management response 630. In this regard, the power limiting management decode and sequencer circuit 632 may be configured to generate local throttle signals 634 to cause the power consumption in the processing device 110 to be throttled. For example, power limiting management decode and sequencer circuit 632 can be configured to generate a sequence of local throttle signals 634 to continually throttle up or down the power consumption of the monitored processing device 110 associated with its LAM circuit 136.

Note that in the sequence of operations and communications described above with regard to the LAM circuits 136 communicating activity power events 606 to the RAM circuits 502, and the RAM circuits 502 communicating aggregated activity power events 138 to the PEL circuit 126, communication delays are incurred. There is a delay between generating the activity samples 600 of sampling of power consumptions in a processing device 110 in a LAM circuit 136 and the reporting and receipt of an associated aggregated activity power event 138 in the PEL circuit 126. This delay can be particularly large for an IC chip 104 that has a larger area, such as one that includes a number of PU clusters 108(0)-108(N) and other processing devices 110 as in the processor-based system 100. By the time the PEL circuit 126 receives the associated aggregated activity power event 138 and processes such to a generation of an associated power limiting management response 140(1)-140(Q), the power consumed by the monitored processing device 110 may have already exceeded desired power limits in an undesired manner and/or for an undesired amount of time, possibly causing the power consumption in the IC chip 104 to exceed designed power limits. Further, instantaneous current demand by a monitored processing device 110 can cause di/dt events or voltage droop events that can cause performance issues and/or failures that may not be able to be timely addressed by the PEL circuit 126.

To mitigate the delay in the PEL circuit 126 receiving aggregated activity power events 138 associated with monitored processing devices 110 in the processor-based system 100 that may affect throttling of power consumption within the processor-based system 100, each of the LAM circuits 136, 136R can also be configured to directly throttle performance of an associated monitored processing device 110 to throttle its current demand and thus throttle its power consumption. This gives the PEL circuit 126 more reaction time to receive and process aggregated activity power events 138 to determine how power consumption in the processor-based system 100 should be throttled to achieve a desired overall performance while also maintaining power consumption within desired limits. In this manner, the LAM circuits 136, 136R may be able to more timely mitigate a power issue by locally throttling power consumption of its specific monitored processing device 110 on a device granularity (without having to throttle performance in other processing devices 110). The LAM circuits 136, 136R can be configured to continuously monitor and throttle power consumption locally in its monitored processing device 110, co-existent with the PEL circuit 126 generating power limiting management responses 140 to limit power consumption by target devices 200 in the processor-based system 100.

In this regard, as shown in FIG. 6, the LAM circuit 136 in this example includes a di/dt circuit 636 to track the rate of change of power consumption by the processing device 110 for local power consumption throttling of its monitored processing device 110. In this regard, the di/dt circuit 636 may be configured to receive the estimated current demand 604 for the activity of the processing device 110 sampled by the LAM circuit 136 from the accumulate circuit 602 in each local time window. For each incoming estimated current demand 604 received (e.g., received for a given local time window), the di/dt circuit 636 may be configured to generate a next summed current demand 638 of such incoming estimated current demand 604 in the next local time window from the accumulate circuit 602 with one or more previously received estimated current demands 604 received for a previous estimated current demand 604 in a previous local time window. In this manner, the next summed current demand 638 is a running sum of the estimated current demands 604 for the processing device 110 over consecutive local time windows. The di/dt circuit 636 may provide the next summed current demand 638 to an application processor 640 that provides a determined next current flow rate 642 based on the next summed current demand 638 to a throttle FSM circuit 644. The throttle FSM circuit 644 may be configured to determine on an ongoing basis whether the next current flow rate 642 of the assigned processing device 110 exceeds a threshold current flow rate or indicates an excessive change in current flow rate beyond those configured for the monitored processing device 110 in the LAM circuit 136. In response to determining that the next current flow rate 642 of the assigned processing device 110 exceeds the threshold current flow rate or indicates an excessive change in current flow rate, the throttle FSM circuit 644 is configured to generate the local throttle signals 634 to throttle the power consumption of the monitored processing device 110.

In this manner, the LAM circuit 136 may be configured to continually monitor the ongoing current flow rate of its monitored processing device 110 to be able to locally throttle the power consumption of the monitored processing device 110. In this manner, the LAM circuit 136 may be configured to respond more quickly to power consumption issues caused by the current demand of the monitored processing device 110, such as di/dt events and voltage droops, before the PEL circuit 126 may be able to respond.

As an example, if the monitored processing device 110 by the LAM circuit 136 is a network node 500 of the internal communication network 114, the local throttle signals 634 generated by the LAM circuit 136 may be a throughput throttle to selectively enable and disable communication flow in the network node 500 to throttle its throughput thus throttling its power consumption. As another example, if the monitored processing device 110 by the LAM circuit 136 is a PU cluster 108(0)-108(N) or other processing device 110, the local throttle signals 634 generated by the LAM circuit 136 may be a performance throttle to selectively throttle performance or workload of the monitored PU cluster 108(0)-108(N) or other processing device 110 to throttle its performance thus throttling its power consumption.

Note that sampling of processing activity discussed herein may be accomplished by determining or sampling a quantity that is associated with an instantaneous activity of the monitored processing device 110. For example, the workload performed by a monitored processing device 100 may be determined or discoverable as an indirect method to determine instantaneous activity that can be correlated to an estimated current or power consumption. As another example, activity of a monitored processing device 110 may be determined by sensing a temperature at a temperature sensor associated with the processing device 110. As another example, a voltage droop may be sensed at the processing device 110 to determine an activity sample. Also, other quantities may be used to sample activity. As an example, an incoming interrupt at the processing device, a status register, a state of an interrupt queue, or a signal indicating whether the processing device is busy or idle may be used for sampling of processing activity.

Note that the components to perform local throttling by the LAM circuit 136 can also be provided in the LAM circuit 136R in the RAM circuit 502 so that the LAM circuit 136R may also be configured to locally throttle a monitored processing device 110.

Figure 7:
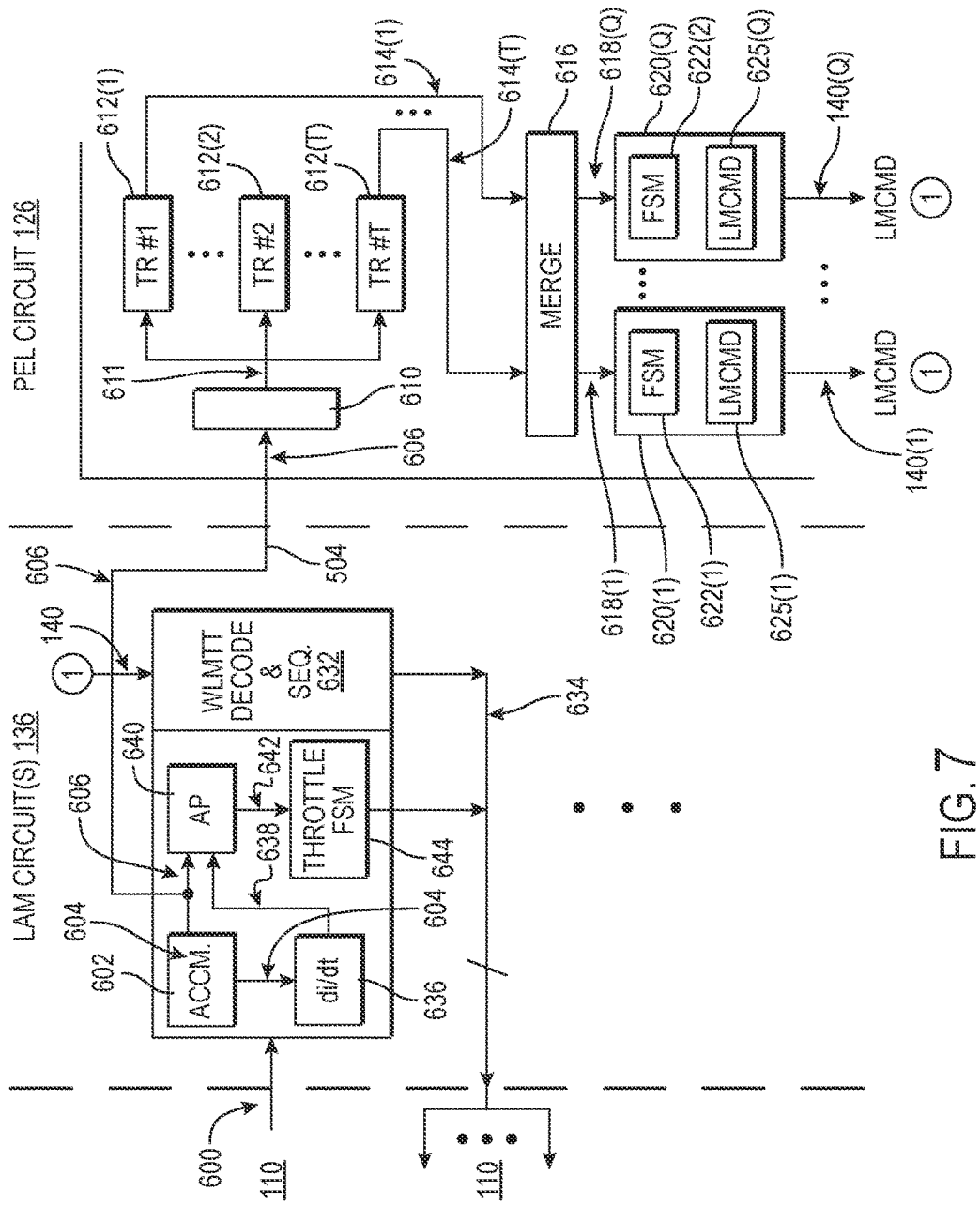
FIG. 7 is a schematic diagram of an exemplary two (2) level hierarchical power management system that can be provided in the processor-based system in the IC chip in FIG. 1, wherein two (2) level hierarchical power management systems may include: a first local level of LAM circuits configured to perform local device monitoring and power consumption throttling, and a second, centralized level of a PEL circuit configured to collect aggregated activity power events regarding power consumption of the monitored processing devices and throttle power in the IC chip in response.

Note that the hierarchical power management system 124 provided in the IC chip 104 for the processor-based system 100 in FIG. 1 is not limited to the three (3) level hierarchical power management system 624 in FIG. 6. For example, FIG. 7 is a schematic diagram of an alternative two (2) level hierarchical power management system 724 that can be provided as the hierarchical power management system 124 in the processor-based system 100 in the IC chip 104 in FIGS. 1-3 and 5. The hierarchical power management system 724 in FIG. 7 is similar to the hierarchical power management system 624 in FIG. 6, except that the intermediate RAM circuits 502 are not included in the hierarchical power management system 724 in FIG. 7. The LAM circuits 136 can be configured to provide activity power events 606 directly to the PEL circuit 126 to be processed. Common elements between the hierarchical power management system 724 in FIG. 7 and the hierarchical power management system 124 in FIGS. 1-3 and 5 are shown with common element numbers and are not re-described.

Also, as discussed herein, it is stated that the PEL circuit 126 receives activity power events 606 from a LAM circuit 136, this receipt of activity power events 606 can be directly from the LAM circuit 136 to the PEL circuit 126 or indirectly from one or more intermediate circuits, including the RAM circuits 502. For example, as discussed above, the activity power events 606 generated by the LAM circuits 136 can be indirectly reported to the PEL circuit 126 the as part of being included in aggregated activity power events 138 generated and reported by a RAM circuit 502 to the PEL circuit 126 as part of received activity power events 606.

Figure 8:
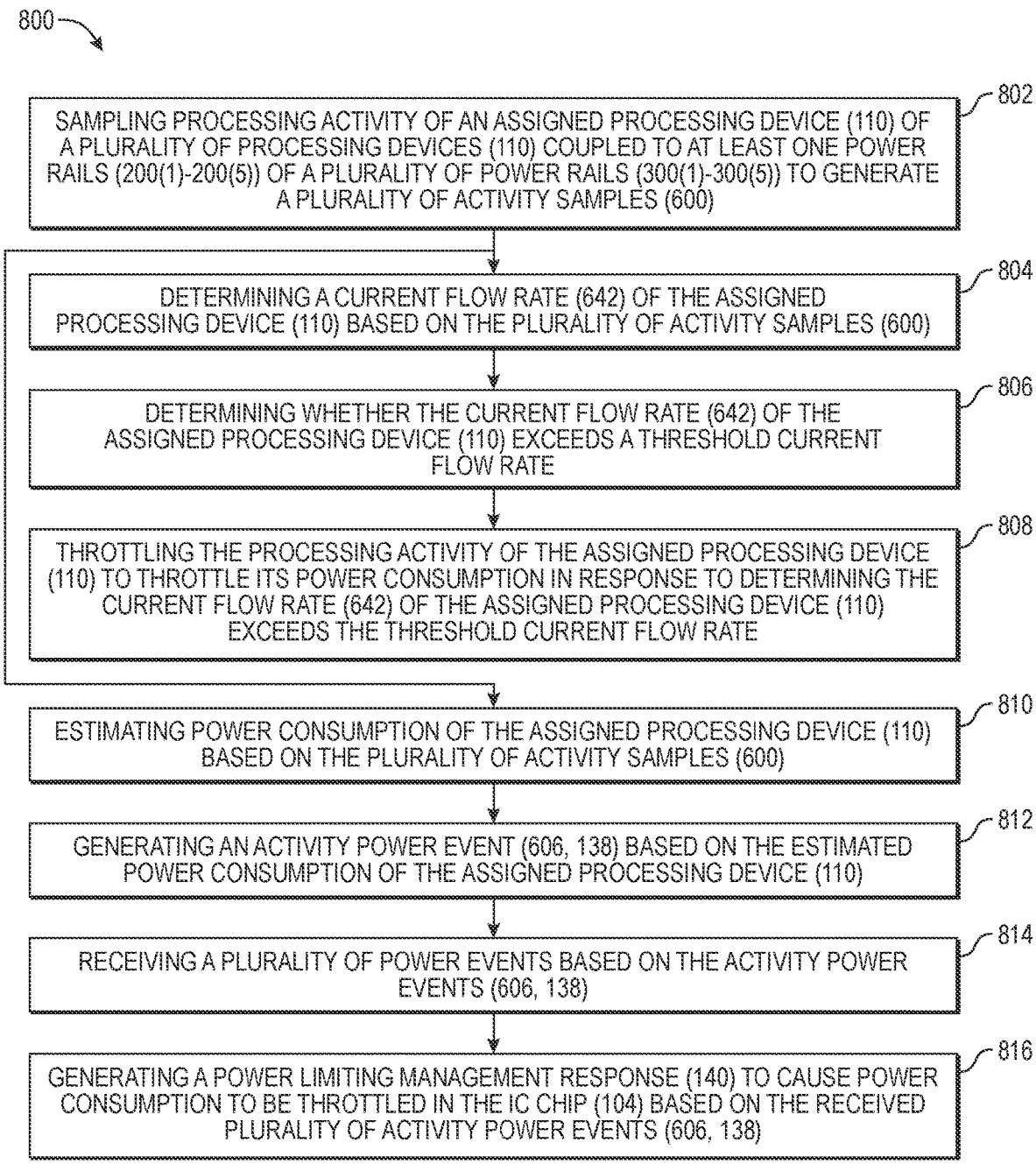
FIG. 8 is a flowchart illustrating an exemplary process of a hierarchical power management system of the processor-based system in FIG. 6, locally monitoring and throttling power consumption of monitored processing devices and hierarchically reporting activity power events related to the monitored power consumption to a PEL circuit configured to throttle power consumption in the processor-based system in response to the received power events.

FIG. 8 is a flowchart illustrating an exemplary process 800 of the LAM circuits 136 and/or the RAM circuits 502 in hierarchical power management systems 124, 624, 724 in FIGS. 1-3 and 5-7 locally monitoring and throttling power consumption of monitored processing devices 110. The process 800 also includes the hierarchically reporting activity power events 606, 138 related to the monitored power consumption by LAM circuits 136 and/or the RAM circuits 502 to throttle power consumption in the processor-based system 100 in response to the received activity power events 606, 138. The process 800 in FIG. 8 is discussed with regard to the hierarchical power management systems 624, 724 as examples.

In this regard, as shown in FIG. 8, a first step of the process 800 can be sampling processing activity of an assigned processing device 110 of a plurality of processing devices 110 coupled to at least one power rails 300(1)-300(5) of a plurality of power rails 300(1)-300(5) to generate a plurality of activity samples 600 (block 802 in FIG. 8). A next step in the process 800 can be determining a current flow rate 642 of the assigned processing device 110 based on the plurality of activity samples 600 (block 804 in FIG. 8). A next step in the process 800 can be determining whether the current flow rate 642 of the assigned processing device 110 exceeds a defined threshold current flow rate (block 806 in FIG. 8). A next step in the process 800 can be throttling the processing activity of the assigned processing device 110 to throttle its power consumption in response to determining the current flow rate 642 of the assigned processing device 110 exceeds the threshold current flow rate (block 808 in FIG. 8). Also, in addition to and/or in parallel to steps 804-808, another step in the process 800 can be estimating power consumption of the assigned processing device 110 based on the plurality of activity samples 600 (block 810 in FIG. 8). A next step in the process 800 can be generating an activity power event 606, 138 based on the estimated power consumption of the assigned processing device 110 (block 812 in FIG. 8). A next step in the process 800 can be receiving a plurality of power events based on the activity power events 606, 138 (block 814 in FIG. 8). A next step in the process 800 can be generating a power limiting management response 140 to cause power consumption to be throttled in the IC chip 104 based on the received plurality of activity power events 606, 138 (block 816 in FIG. 8).

Figure 9A:
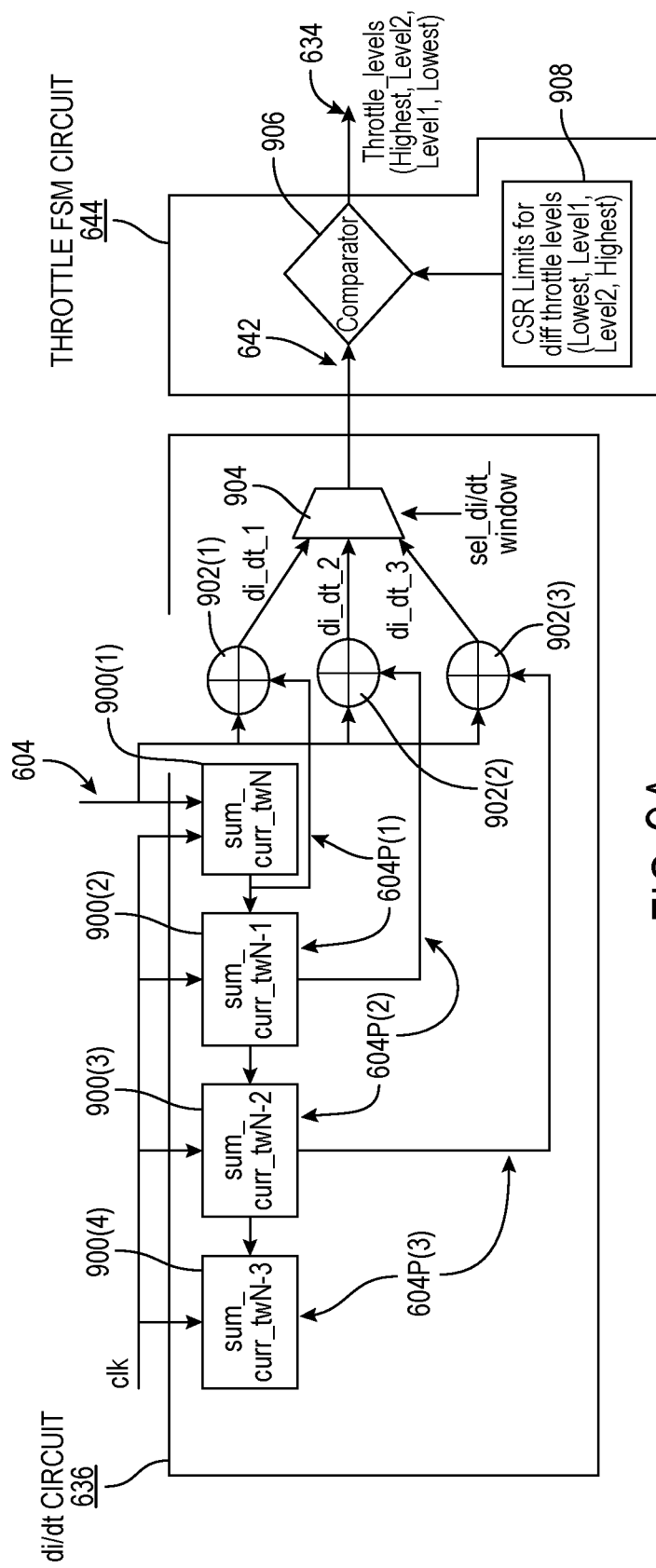
FIG. 9A is a schematic diagram illustrating an exemplary di/dt circuit that can be provided in a LAM circuit in the hierarchical power management system in FIG. 6, wherein the di/dt circuit is configured to collect activity samples of a device monitored by the LAM circuit and correlate the activity samples to estimate current and generate estimated current samples in a designated time window which can then be used to determine the slope of a rate of change in current (di/dt) consumed by the monitored processing device to determine whether the power consumption of the monitored processing device should be throttled by the LAM circuit.

FIG. 9A is a schematic diagram illustrating exemplary detail of the di/dt circuit 636 and throttle FSM circuit 644 in the LAM circuit 136 shown in FIG. 6 to collect received estimated current demands 604 for processing activity of a monitored processing device 110 over local time windows and determine if a current flow rate and/or change in current flow rate of the monitored processing device 110 exceeds a threshold. This information is used by the LAM circuit 136 to determine if its monitored processing device 110 should be locally throttled by its assigned LAM circuit 136, as previously discussed in FIG. 6.

In this regard, as shown in FIG. 9A, the di/dt circuit 636 is configured to receive next estimated current demands 604 that are generated for each local time window of the LAM circuit 136, as discussed in FIG. 6. The di/dt circuit 636 includes a plurality of latch circuits 900(1)-900(4) that are clocked circuits (e.g., flip-flops) and are configured to store the incoming next estimated current demands 604 and previously received estimated current demands 604P(1)-604P(3). Latch circuit 900(1) stores the next incoming estimated current demand 604. The next incoming estimated current demand 604 stored in the latch circuit 900(1) and the previous estimated current demands 604P(1)-604P(3) stored in the latch circuits 900(1)-900(3) are then shifted to the next respective latch circuit 900(2)-900(4) for each newly received incoming estimated current demand 604 representing a local time window. For each incoming estimated current demand 604 received representing a local time window, the incoming estimated current demand 604 and previous estimated current demands 604P(1)-604P(3) are provided to respective summing circuits 902(1)-902(4). The summing circuits 902(1)-902(3) subtract the incoming estimated current demand 604 with a respective previous estimated current demand 604P(1)-604P(3) to generate respective changes to current flow rates over local time windows (i.e., change in current flow rates) $di\_dt\_1$, $di\_dt\_2$, $di\_dt\_3$, as discussed below, of the incoming estimated current demand 604 and the respective estimated current demands 604P(1)-604P(3). Thus, the determined change in current flow rates $di\_dt\_1$, $di\_dt\_2$, $di\_dt\_3$ represent a rate in change in current flow rate or current demand and thus rate of change in power consumption of the monitored processing device 110 between the local time windows when the incoming estimated current demand 604 was received and a previous local time window of the respective previous estimated current demands 604P(1)-604P(3). di_dt_1 is the change in current or current flow rate between respective estimated current demand 604 and 604P(1). di_dt_2 is the change in current or current flow rate between respective estimated current demand 604 and 604P(2). di_dt_3 is the change in current or current flow rate between respective estimated current demand 604 and 604P(3).

Figure 9B:
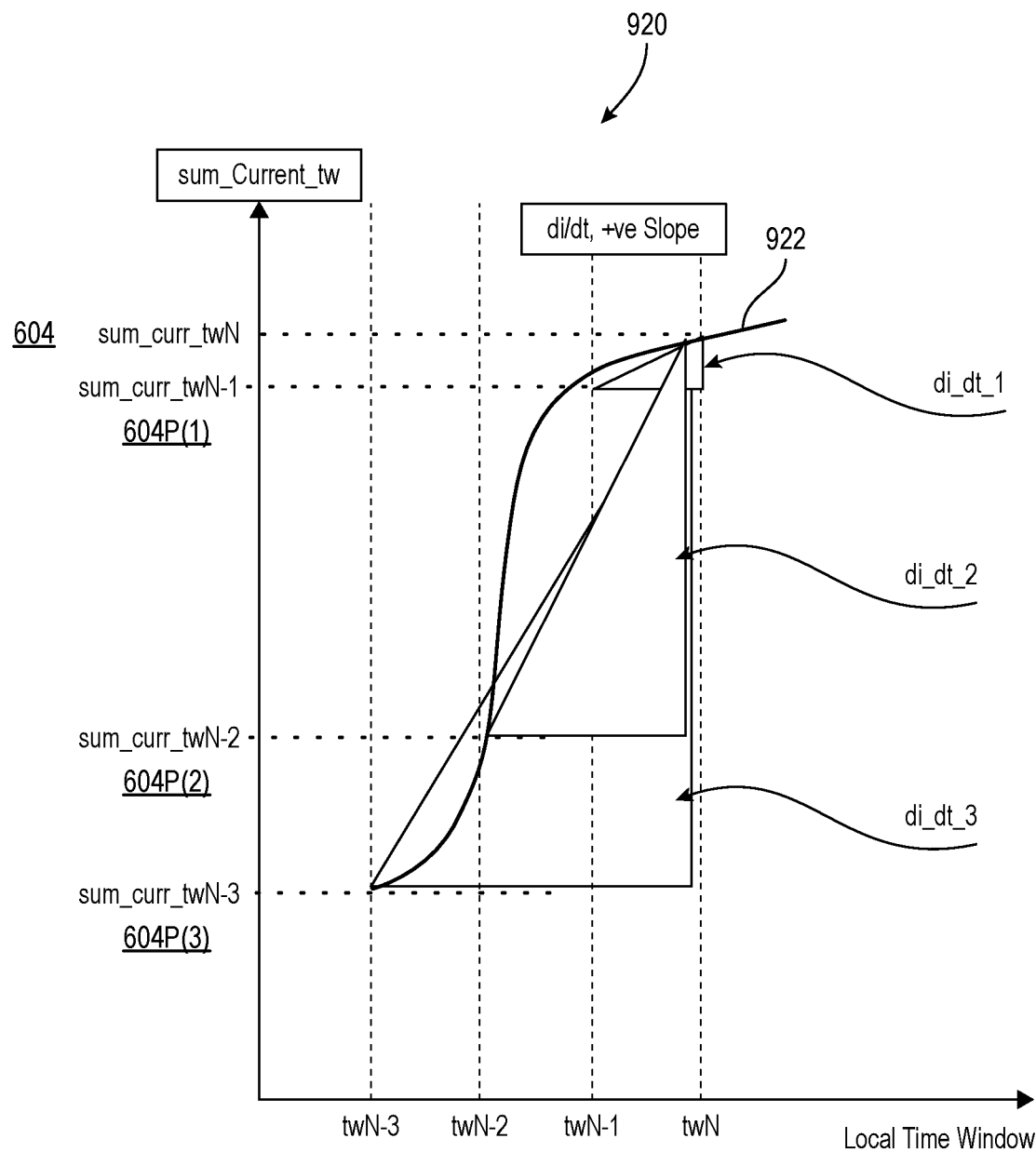
FIG. 9B is a graph illustrating exemplary estimated current samples collected by the di/dt circuit in FIG. 9A plotted as a function of time to determine the rate of change in current (di/dt) consumed by the monitored processing device.

With continuing reference to FIG. 9A, these changes in current flow rates di_dt_1, di_dt_2, di_dt_3 may then be provided to a multiplexing circuit 904 that can selectively provide one of the changes in current flow rates di_dt_1, di_dt_2, di_dt_3 as the next current flow rate 642 to a comparator circuit 906 in the throttle FSM circuit 644, discussed below. The selected change in current flow rate di_dt_1, di_dt_2, di_dt_3 provided as the next current flow rate 642 to the multiplexing circuit 904 may be based on a local time window selection signal sel_di_dt_window to select the local time windows to be compared to each current flow rate. This allows the flexibility of the di/dt circuit 636 to be programmed to select the local time windows of estimated current demands 604P(1), 604P(2) to be compared to the incoming estimated current demand 604. For example, FIG. 9B is a graph 920 illustrating exemplary incoming and estimated current demands 604, 604P(1)-604P(3) collected by the di/dt circuit 636 in FIG. 9A plotted as a function of a local time window to show how the incoming and estimated current demands 604, 604P(1)-604P(3) can be subtracted to generate respective change in current flow rates di_dt_1, di_dt_2, di_dt_3 between the incoming estimated current demand 604 and the estimated current demands 604P(1)-604P(3) over their respective local time windows twN, twN−1, twN−2, twN−3. The duration of the local time windows is known. Thus, the change in current flow rates di_dt_1, di_dt_2, di_dt_3 represent a change in current demand between the incoming estimated current demand 604 in a current local time window and a respective previous estimated current demand 604P(1)-604P(3) over the difference in their local time windows. The current flow rate curve 922 represents the current flow rate of a processing device 110 over a period of local time windows twN−3, twN−2, twN−1, and twN. As shown in FIG. 9B, the slope of the current flow rate curve 922 changes at each of the local time windows twN−3, twN−2, twN−1, and twN based on the change in current demand or change in current flow rate demanded of the processing device 110 between local time windows twN−3, twN−2, twN−1, and twN. FIG. 9B shows the basis on which the di/dt circuit 636 in FIG. 9A can generate the change in current flow rates di_dt_1, di_dt_2, di_dt_3 representing a change in current demand between the incoming estimated current demand 604 in a current local time window and a respective previous estimated current demand 604P(1)-604P(3) over the difference in their local time windows twN−3, twN−2, twN−1, and twN. This can be used to provide the current flow rate 642 of the processing device 110 to use to determine local power consumption throttling.

The selected next current flow rate 642 is provided by the di/dt circuit 636 to the comparator circuit 906 in the throttle FSM circuit 644. The throttle FSM circuit 644 may be configured to generate the local throttle signals 634 to throttle power consumption of the monitored processing device 110 based on whether the selected next current flow rate 642 (from selection of change in current flow rate di_dt_1, di_dt_2, di_dt_3) exceeds a threshold current flow rate (which can include a threshold change in current flow rate) for the monitored processing device 110. The threshold current flow rate for the monitored processing device 110 can be obtained from a current flow rate register 908. The current flow rate register 908 can be programmed with a threshold current flow rate for the monitored processing device 110. For example, the current flow rate register 908 can be programmed with different threshold current flow rates (e.g., lowest, level 1, level 2, highest) so that the comparator circuit 906 can generate local throttle signals 634 for different levels of power consumption throttling based on the comparison of selected next current flow rate 642 (from selection of change in current flow rate di_dt_1, di_dt_2, di_dt_3) with the selected threshold current flow rate obtained from the current flow rate register 908.

Note that when current flow rate is discussed herein, such also means current flow and represents current (I) (e.g., charge (q) over time (t) (q/t)) or a change in the current flow rate (e.g., a change in current over time (di/dt)). A determined change in the current flow rate (di/dt) is determined from a determined current flow rate (t/T).

Figure 10:
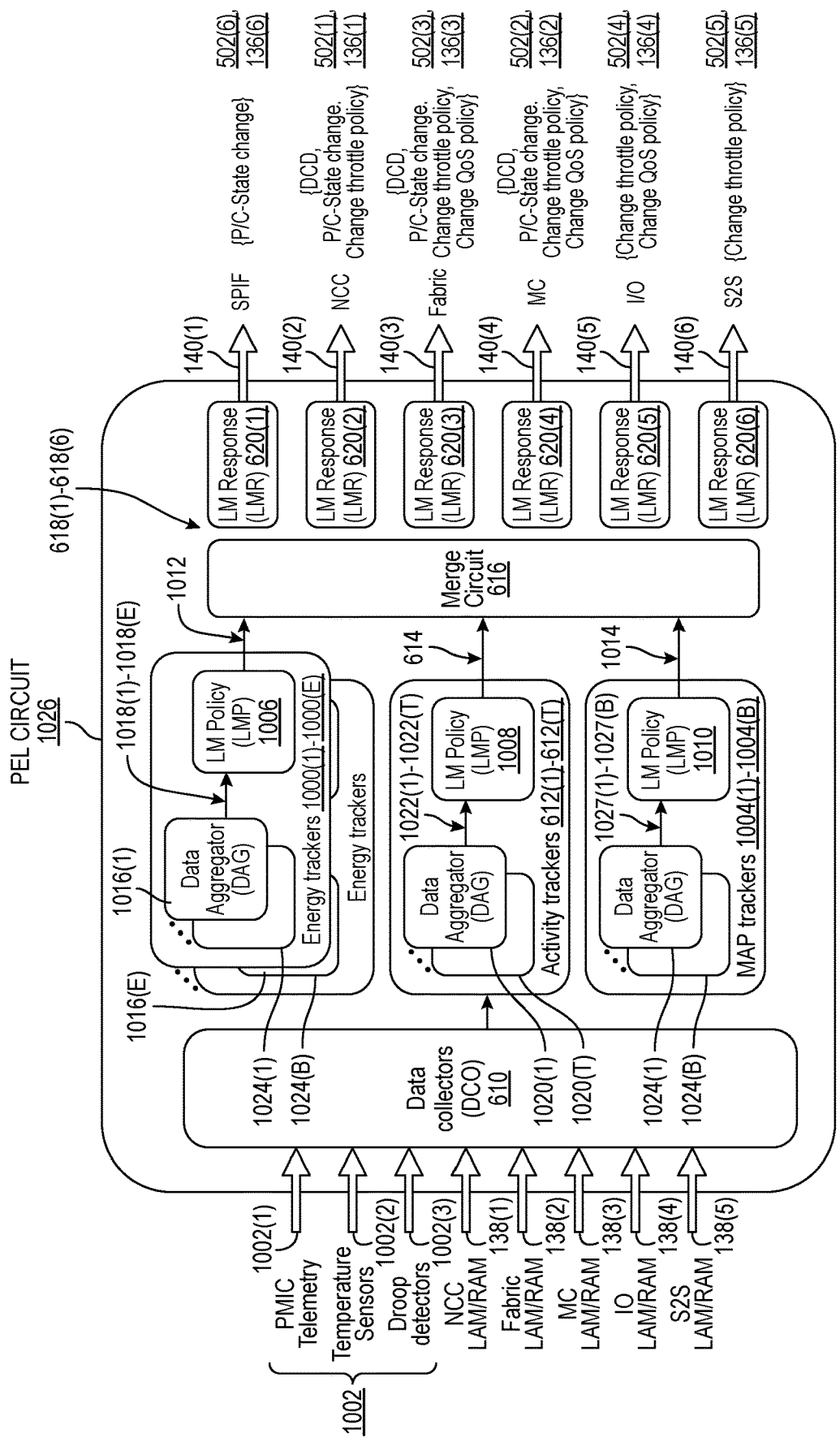
FIG. 10 is a logic diagram of an exemplary PEL circuit that can be provided in a hierarchical power management system of the processor-based system and that illustrates exemplary components for receiving power events, decoding the received power events in tracking circuits, and merging the tracked power events to generate a power limiting management responses to throttle power consumption in the processor-based system in response to the received power events.

The components of the hierarchical power management systems 124, 624, 724 in FIGS. 1-3 and 5-7 described above can be provided in different implementations. For example, FIG. 10 is a logic diagram of another exemplary PEL circuit 1026 that can be any of PEL circuits 126 provided in the hierarchical power management system 124, 624, 724 in FIGS. 1-3 and 5-7. Common elements between the PEL circuit 1026 in FIG. 10 and the PEL circuit 126 in the hierarchical power management system 124, 624, 724 in FIGS. 1-3 and 5-7 are shown with common element numbers.

In another example of the components of the hierarchical power management systems 124, 624, 724 in FIGS. 1-3 and 5-7 described above, FIG. 10 shows the PEL circuit 1026 configured to receive the aggregated activity power events 138(1)-138(5) from the one or more RAM circuits 502. The PEL circuit 1026 can be the PEL circuit 126 provided in the hierarchical power management system 124, 624, 724 in FIGS. 1-3 and 5-7. In this example, the PEL circuit 1026 includes the decode circuit 610 that is configured to decode the received aggregated activity power events 138(1)-138(5) into the corresponding activity tracker circuit 612(1)-612(T) as previously described. The PEL circuit 1026 in this example also includes energy tracker circuits 1000(1)-1000(E) that are associated with energy power events 1002, such as PMIC telemetry power events 1002(1), temperature events 1002(2), and voltage droop detection events 1002(3) (all of which are examples of non-activity power events), that can also affect how the PEL circuit 1026 decides to throttle power. The PEL circuit 1026 in this example also includes maximum average power (MAP) tracker circuits 1004(1)-1004(B), which are circuit trackers that track the total power consumed in the SoC 120 according to a defined maximum power consumption limit. Similar to the activity tracker circuits 612(1)-612(T), the energy tracker circuits 1000(1)-1000(E) and the MAP tracker circuits 1004(1)-1004(B) are configured to respective energy power events 1002(1)-1002(3) and/or aggregated activity power events 138(1)-138(5) to determine whether a factor exists that is dependent on power consumption that exceeds a defined power (e.g., current) threshold/limit.

The energy tracker circuits 1000(1)-1000(E) may each include respective data aggregator circuits 1016(1)-1016(E) that are configured to aggregate the received energy power events 1002 into respective aggregated energy power events 1018(1)-1018(E). The activity tracker circuits 612(1)-612

(T) may also each include respective data aggregator circuits 1020(1)-1020(T) that are configured to aggregate received energy power events into respective aggregated energy power events 1022(1)-1022(T). The MAP tracker circuits 1004(1)-1004(B) may also each include respective data aggregator circuits 1024(1)-1024(T) that are configured to aggregate received energy power events into respective aggregated MAP power events 1027(1)-1027(B). The energy tracker circuits 1000(1)-1000(E), the activity tracker circuits 612(1)-612(T), and the MAP tracker circuits 1004(1)-1004(B) in this example, each include a respective energy power limit management policy circuits 1006, activity power limit management policy circuits 1008, and MAP power limit management policy circuits 1010 that are configured to generate respective energy power throttle recommendations 1012, activity power throttle recommendations 614, and MAP power throttle recommendations 1014. These generated respective energy power throttle recommendations 1012, activity power throttle recommendations 614, and MAP power throttle recommendations 1014 may be based on the respective received aggregated energy power events 1018(1)-1018(E), aggregated activity power events, 1022(1)-1022(T), aggregated MAP power events 1027(1)-1027(B) for the PEL circuit 1026 to process to determine how to throttle power consumption in the IC chip 104.

With continuing reference to FIG. 10, the energy tracker circuits 1000(1)-1000(E), the activity tracker circuits 612(1)-612(T), and the MAP tracker circuits 1004(1)-1004(B) are configured to compare a power consumption indicated by the respective aggregated energy power events 1018(1)-1018(E), aggregated activity power events 1022(1)-1022(T), and aggregated MAP power events 1027(1)-1027(B), to the respective energy power limit management policy circuits 1006, activity power limit management policy circuits 1008, and MAP power limit management policy circuits 1010 energy tracker circuits 1000(1)-1000(E), the activity tracker circuits 612(1)-612(T), and the MAP tracker circuits 1004(1)-1004(B). The energy tracker circuits 1000(1)-1000(E), the activity tracker circuits 612(1)-612(T), and the MAP tracker circuits 1004(1)-1004(B) may then be configured to generate the respective energy power throttle recommendations 1012, activity power throttle recommendations 614, and MAP power throttle recommendations 1014 based on the comparison of the power consumptions indicated by the respective aggregated power events 1018(1)-1018(E), 1022(1)-1022(T), 1027(1)-1027(B) to the respective power limit management policy circuits 1006, 1008, 1010. For example, the energy power limit management policy circuits 1006, the activity power limit management policy circuits 1008, and the MAP limiting management policy circuits 1010 may each have respective a threshold power consumption that is compared to the respective aggregated power events 1018(1)-1018(E), 1022(1)-1022(T), 1027(1)-1027(B) to determine the respective power throttle recommendations 1012, 614, 1014.

With continuing reference to FIG. 10, the PEL circuit 1026 also includes the merge circuit 616 that merges the energy power throttle recommendations 1012, generates respective activity power throttle recommendations 614, and MAP power throttle recommendations 1014 into merged power throttle recommendations 618(1)-618(6). The merged power throttle recommendations 618(1)-618(6) are provided to respective assigned target circuits 620(1)-620(6). Note that each merged power throttle recommendation 618(1)-618(6) can be influenced by power throttle recommendations from each of the energy power throttle recommendations 1012, generate respective activity power throttle recommendations 614, and MAP power throttle recommendations 1014. Each target circuit 620(1)-620(6) is associated with a different target device 200 in the processor-based system 100 in which the PEL circuit 1026 can issue power limiting management responses 140(1)-140(6) to limit the power consumption of such target device 200.

The target devices 200 can include the interface circuits 127(1)-127(Z) that can be throttled by power limiting management responses 140(1) communicated to a RAM circuit 502(6) and/or LAM circuit 136(6) configured to throttle power consumption in such interface circuits 127(1)-127(Z). The target devices 200 can include the PU clusters 108(0)-108(N) that can be throttled by power limiting management responses 140(2) communicated to a RAM circuit 502(1) and/or LAM circuit 136(1) configured to throttle power consumption in such PU clusters 108(0)-108(N). The target devices 200 can include the internal communication network 114 that can be throttled by power limiting management responses 140(3) communicated to a RAM circuit 502(3) and/or LAM circuit 136(3) configured to throttle power consumption in such internal communication network 114. The target devices 200 can include the memory controllers 118(0)-118(M) that can be throttled by power limiting management responses 140(4) communicated to a RAM circuit 502(2) and/or LAM circuit 136(2) configured to throttle power consumption in such memory controllers 118(0)-118(M). The target devices 200 can include the I/O interface circuits 120(0)-120(X) that can be throttled by power limiting management responses 140(5) communicated to a RAM circuit 502(4) and/or LAM circuit 136(4) configured to throttle power consumption in such I/O interface circuits 120(0)-120(X). The target devices 200 can include the S2S interface circuits 122(0)-122(Y) that can be throttled by power limiting management responses 140(6) communicated to a RAM circuit 502(5) and/or LAM circuit 136(5) configured to throttle power consumption in such S2S interface circuits 122(0)-122(Y).

The merge circuit 616 in the PEL circuit 1026 can be programmed to map (e.g., through firmware, electronic fuses, etc.) merged power throttle recommendations 618(1)-618(6) to a particular target device 200, and thus a target circuit 620(1)-620(6), that may not directly correlate to each other. In this manner, the merged power throttle recommendations 618(1)-618(6) related to power issues and power consumption in the IC chip 104 can be mapped in the PEL circuit 1026 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 1026 can be configured and changed even after the IC chip 104 is deployed in an application.

With continuing reference to FIG. 10, the target circuits 620(1)-620(6) may each be configured to determine if the power consumption of an associated target device 200 in the processor-based system 100 should be throttled based on the merged power throttle recommendations 618(1)-618(6) provided to the target circuits 620(1)-620(6). The target circuits 620(1)-620(6) may each be configured to analyze the respectively received merged power throttle recommendation 618(1)-618(6) to determine if the power consumption of an associated target device 200 should be throttled. If a target circuit 620(1)-620(Q) determines that the power consumption of an associated target device 200 in the processor-based system 100 should be throttled, the target circuit 620(1)-620(Q) causes an associated power limiting management response 140(1)-140(6) to be generated to be communicated to a respective RAM circuit 502(1)-502(6) and/or LAM circuit 136(1)-136(6) cause the power consumption of a target device 200 associated with the power limiting management response 140(1)-140(Q) to limit power consumption.

Figure 11:
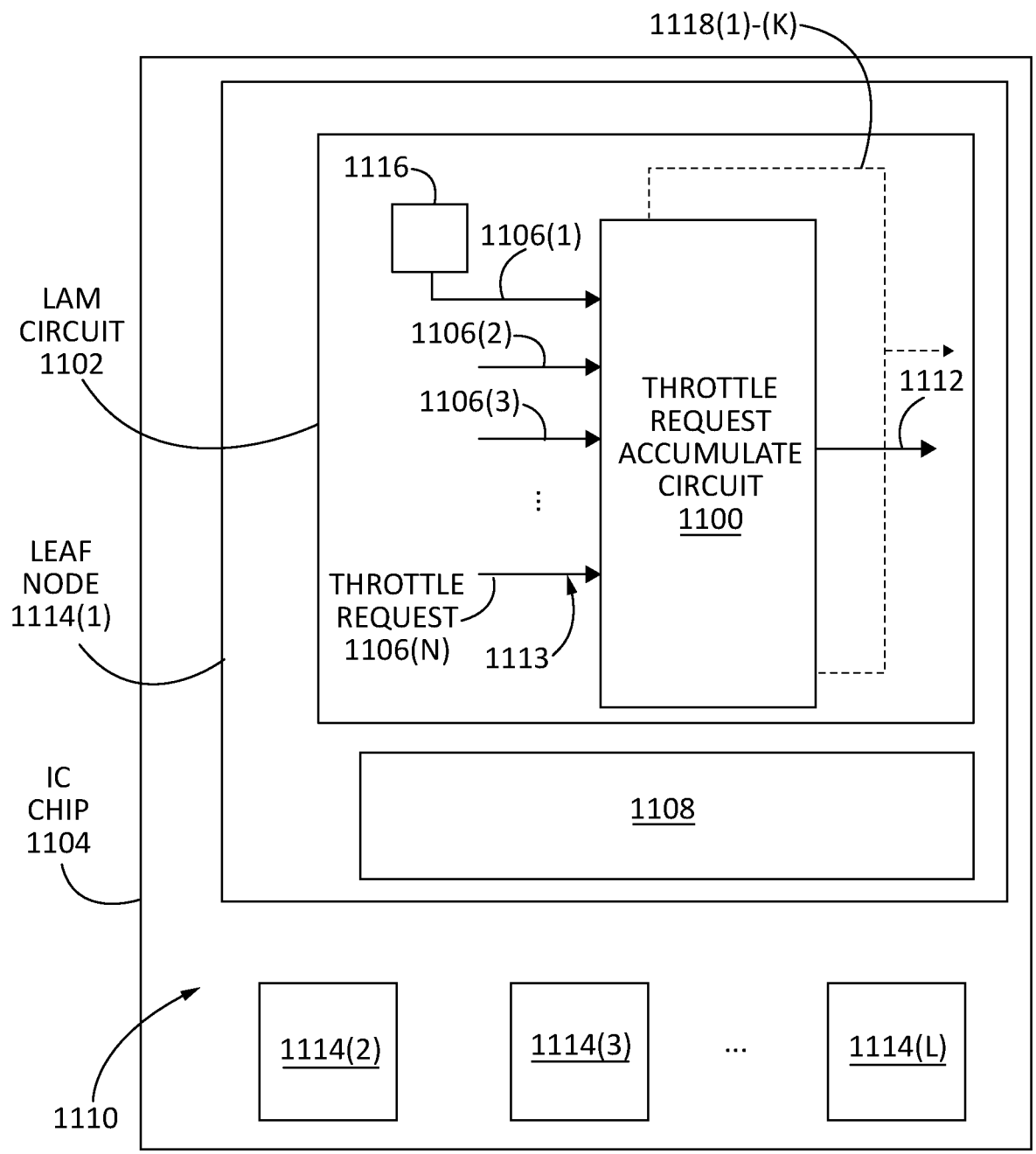
FIG. 11 is a block diagram of an exemplary throttle request accumulate circuit in an IC chip that is configured to accumulate throttle requests and generate a throttle control signal to locally throttle activity of processing circuits in the processor-based system.

The components of a power management system, such as hierarchical power management systems 124, 624, 724 in FIGS. 1-3 and 5-7 described above, can be provided in different implementations, including circuits that implement throttling locally. As an example, FIG. 11 is a block diagram illustrating an exemplary throttle request accumulate circuit 1100, in a LAM circuit 1102 in an IC chip 1104 and is configured to accumulate throttle requests 1106(1)-1106(N) to provide locally controlled throttling of activity in processing circuits 1108 in the processor-based system 1110. The LAM circuit 1102, IC chip 1104, and processor-based system 1110 may be the LAM circuit 136/136R, the IC chip 104, and the processor-based system 100, respectively, in FIG. 1. The processing circuits 1108 may include the processing devices 110 in FIG. 1. It should be understood that the descriptions below of the throttle request accumulation circuit 1100 in a LAM circuit 136 also apply to the throttle request accumulation circuits 1100 in a LAM circuit 136R in the RAM circuits 502 in FIG. 5.

The throttle request accumulate circuit 1100 is configured to generate a throttle control signal 1112 based on the accumulated throttle requests 1106(1)-1106(N) to throttle activity of the processing circuits 1108 associated with the LAM circuit 1102. In some examples, throttling activity of processing circuit 1108 may include providing the throttle control signal 1112 having a throttle value 1113 that indicates an extent to which the processing circuits 1108 are to be throttled, as explained further below. For example, a higher throttle value 1113 may be more restrictive or may more aggressively reduce activity in the processing circuits 1108. In other examples, a lower throttle value 1113 may be more restrictive.

The processing circuits 1108 that may be throttled by the throttle request accumulation circuit 1100 in a LAM circuit 136 are circuits local to at least one of the LAM circuits 136, which are distributed across the processor-based system 1110, as shown in the example in FIG. 5. The terms "locally" and "local to" and related terms used herein to describe a relationship of circuits or other features to the processing devices 1108, for example, may refer to functional, logical, and/or hierarchical proximity, in addition to a physical proximity. In this regard, the processor-based system 1110 includes leaf nodes 1114(1)-1114(L) that include circuits and/or features that are local to each other, may be monitored by a particular one of the LAM circuits 1102, and may be associated with a same particular network node of the internal communication network 114 in FIG. 1 where communication channels intersect at switches or routers. Each of the leaf nodes 1114(1)-1114(L) includes processing circuits 1108 and the LAM circuit 1102, which includes the throttle request accumulate circuit 1100. Each of the leaf nodes 1114(1)-1114(L) may include any circuits that are directly coupled to the associated network node, as well as circuits that are coupled directly to another circuit. In non-limiting examples, the processing circuits 1108 in a first leaf node 1114(1) may include the processing devices 110 in FIG. 1, a network node of the internal communication network 114, the PU clusters 108(0)-108(N), the memory circuit(s) DDR0-DDR7, DDR8-DDR15, the I/O interface circuit(s) 120(0)-120(7), the S2S interface circuits 122(0)-122(Y), and/or the interface circuits 127(0)-127(Z).

As noted above, the act of monitoring devices may include sampling of processing activity, which may be accomplished by determining or sampling a quantity that is associated with an instantaneous activity, state, or condition local to the monitored processing circuits 1108 or changes in activity, state, or condition over a time window that may include multiple cycles of a clock signal (e.g., clock signal 508). Activity (e.g., circuit switching) in the processing circuits 1108 may be monitored by various circuits internal to and external to the LAM circuit 1102. In addition to monitoring the activity itself, the power consumed during the activity of the processing devices 1108 can be detected as a variety of direct and indirect effects local to the LAM circuit 1102. These effects can include or cause a reduction in performance and/or may potentially result in physical damage to the processor-based system 1110. In this regard, activity of monitored processing circuits may be monitored or detected by, for example, the activity trackers similar to the activity tracker circuits 612(1)-612(T) in FIG. 6 or by firmware. Activity and power consumption monitoring may be implemented by a current change (di/dt) circuit 1116 within or local to the LAM circuit 1102. The di/dt circuit 1116 may be the di/dt circuit 636 in FIG. 6. Power consumption can be detected in and around a leaf node and in adjacent leaf nodes (e.g., regionally) by a network of the temperature sensor(s) 132 and/or telemetry sensor(s) 134 in FIG. 1. Sensors/monitors (not shown) may also be employed local to the processing circuits 1108 to detect, for example, peak power consumption, average power consumption, peak voltage, voltage droop, average voltage, peak current, average current, rate of change of voltage, and temperature. Any of such sensors or monitors may generate the accumulated throttle requests 1106(1)-1106(N). Other possible sources for the accumulated throttle requests 1106(1)-1106(N) include the PEL circuits 126, Each circuit for monitoring the processing circuits 1108 in a leaf node can generate one of the throttle requests 1106(1)-1106(N) having up to a maximum or highest (e.g., most restrictive) throttle value 1113. Similarly, hierarchical circuits, such as the RAM circuits 502 and the PEL circuits 126, can also provide one of the throttle requests 1106(1)-1106(N). Receiving and accumulating such signals, the throttle request accumulate circuit 1100 can provide a dynamic local reaction to local events/conditions as well as to higher level circuits, and ensure that the throttling of activity is consistently based on requests from any of the sources of the throttle requests 1106(1)-1106(N). In some examples, the throttle request accumulate circuit 1100 throttles activity based on a highest request among the throttle requests 1106(1)-1106(N).

Examples of throttling activity in the monitored processing circuits 1108 may include selectively throttle throughput, which may include selectively enabling and disabling communication flow in the network node associated with a leaf node, thus throttling its power consumption. As another example, if the processing circuits 1108 monitored by the LAM circuit 1102 is a PU cluster 108(1)-108(N) or other processing device 110, the local throttle control signals generated by the throttle request accumulate circuit 1100 may be a performance throttle to selectively throttle performance or workload of the monitored PU cluster 108(0)-108(N) or other processing device 110 to throttle its activity, thus throttling its power consumption.

With further reference to FIG. 11, the LAM circuit 1102 may include one or more additional throttle request accumulate circuits 1118(1)-1118(K) that are identical in function to the throttle request accumulate circuit 1100 except that they may receive throttle requests than the set of throttle requests 1106(1)-1106(N) and may be provided to control (throttle) a different portion or portions of the processing circuits 1108 than the throttle request accumulate circuit 1100 in the first leaf node 1114(1). Alternatively, one or more of the throttle request accumulate circuits 1118(1)-1118(K) may couple to and throttle the same processing circuits 1108 as the throttle request accumulate circuit 1100 based on a different set of throttle requests. The throttle request accumulate circuits 1118(1)-1118(K) may provide the ability to throttle portions of the processing circuits 1108 with finer granularity to improve local power management.

Figure 12:
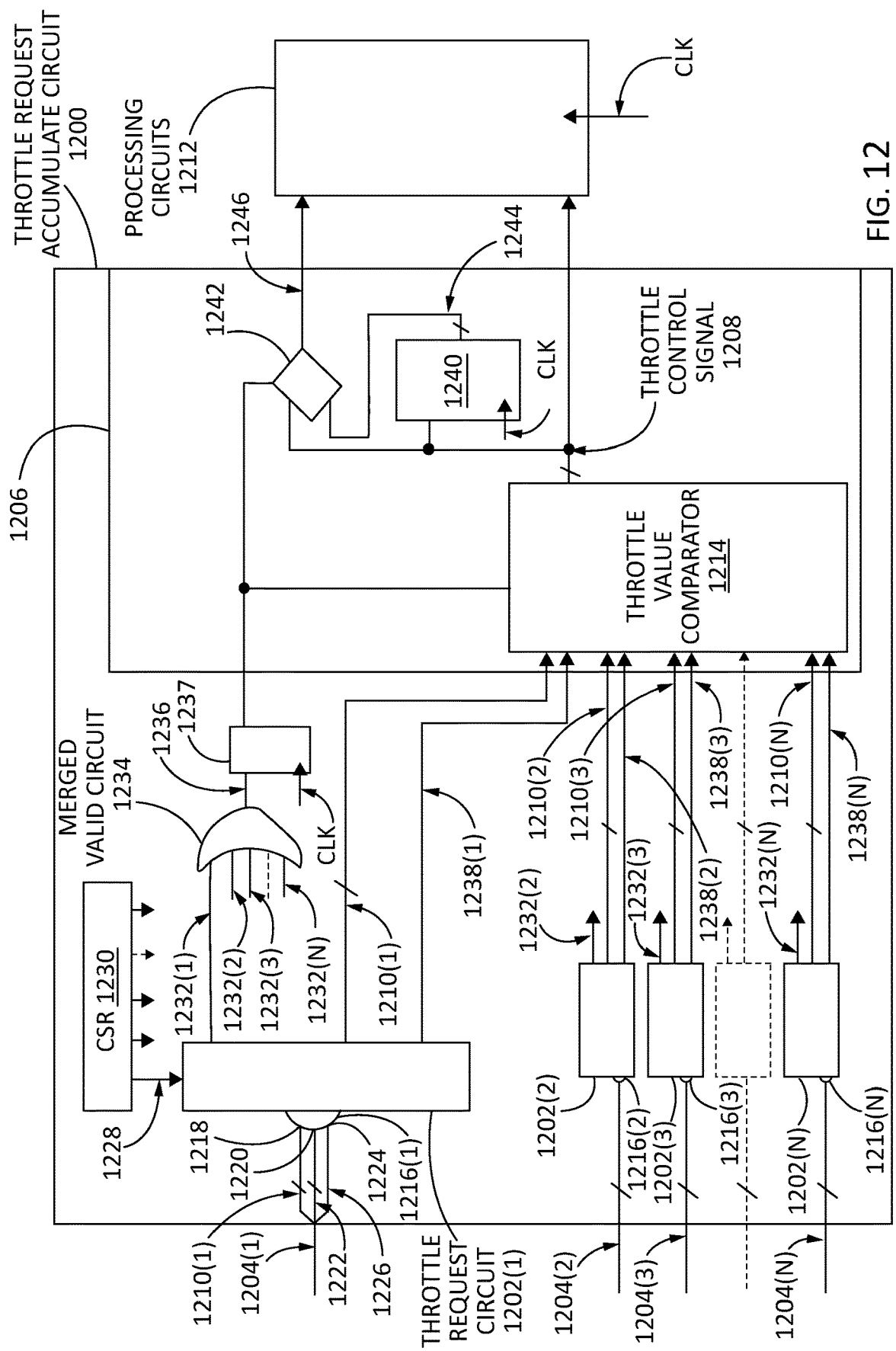
FIG. 12 is a logic diagram of throttle request accumulate circuit including throttle request circuits to receive throttle requests, and including a throttle value circuit to generate a throttle control signal.

FIG. 12 is a logic diagram of a throttle request accumulate circuit 1200, including throttle request circuits 1202(1)-1202(N) that are each configured to receive one of throttle requests 1204(1)-1204(N), and also including a throttle value circuit 1206 configured to generate a throttle control signal 1208. The throttle request accumulate circuit 1200 may be the throttle request accumulate circuit 1100 in FIG. 11. The throttle requests 1204(1)-1204(N) include throttle values 1210(1)-1210(N), respectively, and the throttle control signal 1208 is generated from of the throttle values 1210(1)-1210(N). In this example, the throttle control signal 1208 is generated from a highest one of the throttle values 1210(1)-1210(N). The throttle control signal 1208 may be employed to throttle processing circuits 1212, which may be the processing circuits 1108 in FIG. 11 and as described above.

The processing circuits 1212 include digital sequential logic circuits that operate (e.g., change state) in response to a clock signal CLK, which may be the clock signal 508 in FIG. 5. For example, the clock signal CLK may be a square wave with a 50% duty cycle, and the processing circuits 1208 are triggered in response to a level or in response to a rising or falling "edge" of the clock signal CLK.

The throttle values 1210(1)-1210(N) of the throttle requests 1204(1)-1204(N) are received and stored by the throttle request circuits 1202(1)-1202(N), as described in more detail with reference to FIG. 13. The throttle requests 1204(1)-1204(N) may be received with updated throttle values 1210(1)-1210(N) as frequently as every cycle of the clock signal CLK, or less frequently. It may be any number of cycles between updates of the throttle requests 1204(1)-1204(N). The throttle request circuits 1202(1)-1202(N) are configured to provide the throttle values 1210(1)-1210(N) based on the received throttle requests 1204(1)-1204(N). The throttle value circuit 1206 is configured to receive the throttle values 1210(1)-1210(N) provided by the throttle request circuits 1202(1)-1202(N) and generate the throttle control signal 1208 based on one of the received throttle values 1210(1)-1210(N). The throttle value circuit 1206 may determine which of the throttle values 1210(1)-1210(N) is a highest (most restrictive) value. The throttle value circuit 1206 includes a throttle value comparator 1214 to determine which of the throttle values 1210(1)-1210(N) is highest. The throttle value circuit 1206 is configured to, in each cycle of the clock signal CLK, generate the throttle control signal 1208 based on one of the received throttle values 1210(1)-1210(N). In some examples, the throttle value circuit 1206 is configured to, in each cycle of the clock signal CLK, generate the throttle control signal 1208 based on a highest one of the received throttle values 1210(1)-1210(N).

The throttle request accumulate circuit 1200 includes throttle input interfaces 1216(1)-1216(N) that each receive one of the throttle requests 1204(1)-1204(N). Each of the throttle input interfaces 1216(1)-1216(N) is coupled to one of the throttle request circuits 1202(1)-1202(N). The throttle input interfaces 1216(1)-1216(N) each include a throttle request input 1218 and a target identifier (ID) input 1220. Each throttle request input 1218 receives one of the throttle values 1210(1)-1210(N), and each target ID input 1220 receives a target leaf node identifier 1222. Some or all of the throttle requests 1204(1)-1204(N) may be provided to the throttle request accumulate circuit 1200 in more than one of the leaf nodes 1114(1)-1114(L) in FIG. 11 and/or may be provided to at least one of the additional throttle request accumulate circuits 1118(1)-1118(K) (shown in FIG. 11) of the first leaf node 1114(1). Thus, in each of the throttle input interfaces 1216(1)-1216(N), the target leaf node identifier 1222 is provided on the target ID input 1220 to identify which of the leaf nodes 1114(1)-1114(L) is the target (e.g., intended recipient) of the corresponding one of the throttle requests 1204(1)-1204(N).

Each of the throttle input interfaces 1216(1)-1216(N) also includes a throttle value valid input 1224 configured to receive a valid indication 1226, which indicates that, in the example of the throttle input interface 1216(1), the throttle value 1210(1) on the throttle request input 1218 and the target leaf node identifier 1222 on the target ID input 1220 are valid in a cycle of the clock signal CLK. In each of the throttle input interfaces 1216(1)-1216(N), in each cycle of the clock signal CLK in which the valid indication 1226 is asserted on the throttle value valid input 1224, the target leaf node identifier 1222 is compared to a leaf node identifier 1228. The leaf node identifier 1228 may be provided to each of the throttle request circuits 1202(1)-1202(N) in the throttle request accumulate circuit 1200 in the leaf node 1114(1), for example, from a configuration storage register (CSR) 1230. The CSR 1230 in each leaf node may be programmed with a unique leaf node identifier 1228.

The throttle request circuits 1202(1)-1202(N) are configured to compare the target leaf node identifier 1222 and the leaf node identifier 1228 and, in response to their matching, generate confirmed valid signals 1232(1)-1232(N), indicating that the corresponding one of the throttle values 1210(1)-1210(N) is valid in the current cycle of the clock signal and is directed to the leaf node 1114(1). More than one of the throttle request circuits 1202(1)-1202(N) may generate the confirmed valid signal 1232 in a same cycle of the clock signal CLK. In the throttle request circuits 1202(1)-1202(N) in which the confirmed valid signal 1232 is generated in a particular cycle of the clock signal CLK, the corresponding ones of the throttle values 1210(1)-1210(N) are stored. In the throttle request circuits 1202(1)-1202(N), in which the confirmed valid signal 1232 is not generated in the particular cycle, previously stored throttle values 1210(1)-1210(N) continue to be stored. In this manner, the throttle request circuits 1202(1)-1202(N) store the most recently received valid throttle values 1210(1)-1210(N) in each cycle of the clock signal CLK.

The throttle request accumulate circuit 1200 also includes a merged valid circuit 1234 that receives the confirmed valid signal 1232 generated in each of the throttle request circuits 1202(1)-1202(N) and generates a merged confirmed valid signal 1236 if any one of the confirmed valid signals 1232 is activated. The merged confirmed valid signal 1236 being generated (e.g., in an active state) indicates that at least one of the throttle values 1210(1)-1210(N) has been updated, and the throttle control signal 1208 may need to be updated by the throttle value circuit 1206. The merged confirmed valid signal 1236 is stored for one cycle in a storage circuit 1237 for synchronization with the throttle values 1210, as described below. Before operation of the throttle value circuit 1206 is described in more detail, details of the throttle request circuits 1202(1)-1202(N) are provided with reference to FIG. 13.

Figure 13:
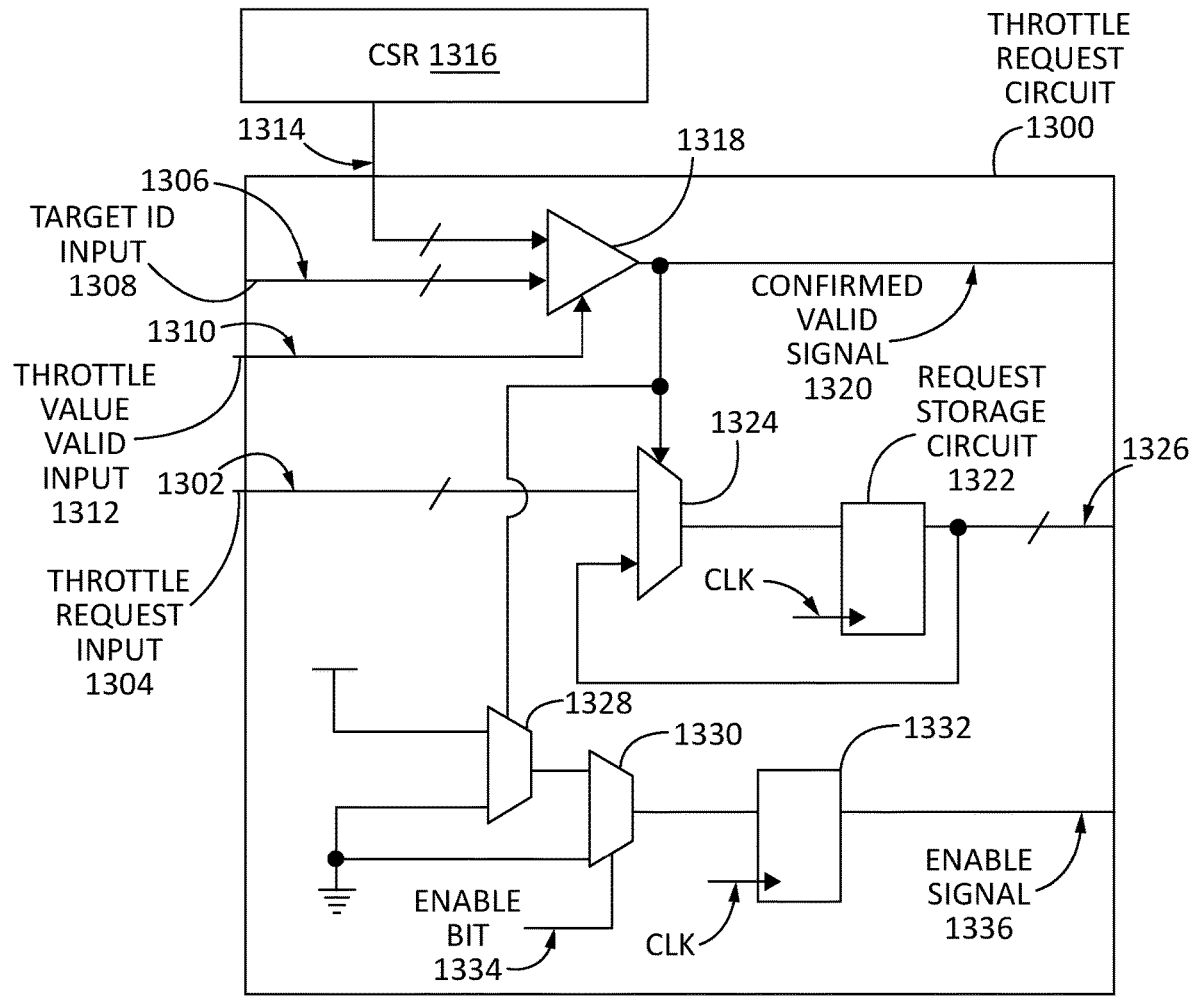
FIG. 13 is a logic diagram showing details of one example of the throttle request circuits in the throttle request accumulate circuit in FIG. 12.

FIG. 13 is a logic diagram showing details of one example of a throttle request circuit 1300, which may be the throttle request circuits 1202(1)-1202(N) in the throttle request accumulate circuit 1200 in FIG. 12. The throttle request circuit 1300 receives a throttle request 1302 on a throttle request input 1304, a target leaf node identifier 1306 on a target ID input 1308, and a valid indication 1310 on a throttle value valid input 1312. The throttle request circuit 1300 also receives a leaf node identifier 1314, which is a unique identifier of the throttle request circuit 1300, from a CSR 1316.

The throttle request circuit 1300 includes a target ID comparator circuit 1318 that receives the leaf node identifier 1314 and the target leaf node identifier 1306. In response to receiving the valid indication 1310 (e.g., in an active state), the target ID comparator circuit 1318 generates a confirmed valid signal 1320, which corresponds to the merged confirmed valid signal 1236. The throttle request circuit 1300 includes a request storage circuit 1322 which stores a new throttle request 1302 in response to the confirmed valid signal 1320 being generated or activated. A request multiplexer 1324 controlled by the confirmed valid signal 1320 receives the throttle request 1302 and provides the throttle request 1302 to the request storage circuit 1322, which stores the throttle request 1302 in response to the clock signal CLK and provides the throttle request 1302 to a storage request output 1326. If the confirmed valid signal 1320 is inactive in a particular cycle, the request multiplexer 1324, the throttle request 1302 previously stored on the storage request output 1326, is fed back into the request storage circuit 1322 in each cycle of the clock signal CLK. In this regard, the merged confirmed valid signal 1236 is output from the storage circuit 1237 in a same cycle as the corresponding throttle request 1302 is on the storage request output 1326.

The CSR 1316 also includes an enable bit (not shown) providing an enable signal EN with which the throttle request circuit 1300 in a corresponding leaf node can be enabled or disabled. The throttle request circuit 1300 includes a first enable multiplexer 1328 and a second enable multiplexer 1330 that provide a logical "1" to an enable storage circuit 1332 in response to the confirmed valid signal 1320 and an enable bit 1334, both being active. The enable storage circuit 1332 will store the "1" and generate an enable signal 1336, indicating that the throttle request circuit 1300 is enabled until the CSR 1316 is changed (e.g., by a write to the CSR 1316) to reset the enable bit. The enable signal 1336 in FIG. 13 is shown as the enable signals 1238(1)-1238(N) in FIG. 12.

Referring back to FIG. 12, the enable signals 1238(1)-1238(N) are employed in the throttle value circuit 1206 in FIG. 12 to determine which throttle request circuits 1202(1)-1202(N) are active and, therefore, which of the throttle values 1210(1)-1210(N) should be considered for generating the throttle control signal 1208, which may be based on determining a highest or most restrictive of the throttle values 1210(1)-1210(N). The throttle value circuit 1206 receives the throttle values 1210(1)-1210(N) from the throttle request circuit 1202(1)-1202(N) and also receives enable signals 1238(1)-1238(N), corresponding to the enable signal 1336 in FIG. 13, from each of the throttle request circuits 1202(1)-1202(N). For any of the throttle request circuits 1202(1)-1202(N) in which the corresponding one of the enable signals 1238(1)-1238(N) is inactive (e.g., "0" or disabled), the corresponding throttle value 1210 may be ignored. Among the throttle request circuits 1202(1)-1202(N) in which the corresponding one of the enable signals 1238(1)-1238(N) is active ("1" or enabled), the throttle value comparator 1214 determines which throttle value 1210 is highest in each cycle, as long as the merged confirmed valid signal 1236 is generated. In some examples, the throttle control signal 1208 is generated from the highest throttle value 1210. In other examples, alternative algorithms may be provided to determining how the throttle control signal 1208 is generated, based on the throttle values 1210(1)-1210(N) received from the throttle request circuit 1202(1)-1202(N). If the merged confirmed valid signal 1236 is not generated, this indicates that none of the throttle values 1210(1)-1210(N) has been updated, and the throttle value comparator 1214 does not need to determine a new highest throttle value, and the throttle control signal 1208 remains unchanged.

The throttle value circuit 1206 also includes a control signal storage 1240 and a control signal comparator 1242. The control signal storage 1240 receives the throttle control signal 1208 in each cycle of the clock signal CLK and therefore provides a previous throttle control signal 1244 from a previous cycle. The control signal comparator 1242 compares the throttle control signal 1208 to the previous throttle control signal 1244 in each cycle to recognize when the throttle control signal 1208 has changed. In response to the throttle control signal 1208 being different than the previous throttle control signal 1244, the control signal comparator 1242 generates a control signal change indicator 1246, indicating a change in the throttle control signal 1208. The control signal change indicator 1246 can be employed in the processing circuits 1212 to indicate that the throttle control signal 1208 has changed.

Figure 14:
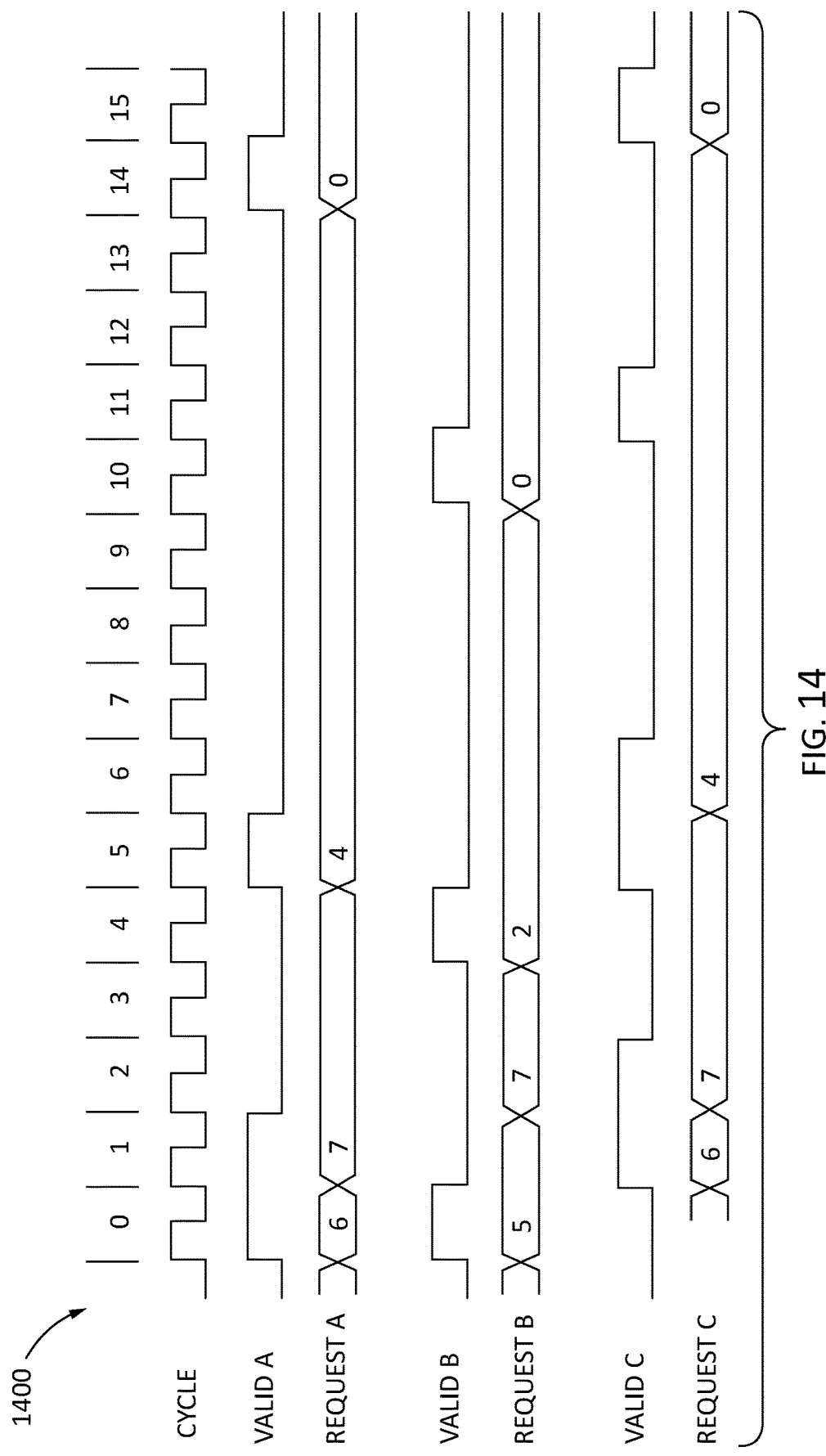
FIG. 14 is a timing diagram illustrating operation of the throttle request accumulate circuit in FIG. 12 generating a throttle control value based on throttle requests.

FIG. 14 is a timing diagram 1400 illustrating operation of the throttle value circuit 1206 in the throttle request accumulate circuit 1200 in FIG. 12. The description of FIG. 14 includes references to both FIG. 12 and FIG. 13, which both illustrate features of the throttle request circuit 1200. The timing diagram 1400 in FIG. 14 is based on the example of the throttle value circuit 1206 generating the throttle control signal 1208 based on a highest one of the throttle values 1210(1)-1210(N) from the throttle request circuit 1202(1)-1202(N), although the throttle value circuit 1206 may be configured to employ other algorithms or methods. In the example shown in FIG. 14, the diagram 1400 includes examples of two signals found in each of two throttle request circuits, which could be any two of the throttle request circuits 1202(1)-1202(N) in FIG. 12. The signals "valid A" and "request A" correspond to the merged confirmed valid signal 1236 and the throttle value 1210, respectively, from a first throttle request circuit. Signals "valid B" and "request B" are examples from a second throttle request circuit. The diagram 1400 also shows the control value change indicator 1246 and the throttle control signal 1208 (referred to as "request C").

The throttle control signal 1208 or request C only changes following new throttle requests, which are indicated by valid A and valid B. One or both of the valid A and valid B is active in cycles 0, 1, 4, 5, 10, and 14, indicating that updates to one or both of request A and request B have been received in the throttle request circuits in those cycles. In response, one cycle later (i.e., cycles 1, 2, 5, 6, 11, and 15), the valid C and the request C may transition. These transition events are discussed individually.

Cycle 0 to Cycle 1

Since one or both of valid A and valid B are active in cycle 0, indicating that request A and request B have new values, request A ("6") is compared to request B ("5") to determine which is higher. Because the higher ("6") of request A and request B is different than the request C in cycle 0, valid C is activated in cycle 1, and the new highest throttle value ("6") is provided as request C.

Cycle 1 to Cycle 2

Because valid A is active in cycle 1, indicating that request A has a new value, request A ("7") is compared to request B ("5") to determine which is higher. Because the higher ("7") of request A and request B is different than the request C in cycle 0, valid C is activated in cycle 2, and the new highest throttle value ("7") is provided as request C.

Cycle 4 to Cycle 5

Because valid B is active in cycle 4, indicating that request B has a new value ("2"), request A ("7") is compared to request B ("2") to determine which is higher and valid C is activated in cycle 5. However, because the higher ("7") of request A and request B is not different than the request C in cycle 4, the request C is unchanged.

Cycle 5 to Cycle 6

Because valid A is active in cycle 5, indicating that request A has a new value ("4"), request A ("4") is compared to request B ("2") to determine which is higher. Because the higher ("4") of request A and request B is different than the request C in cycle 5, valid C is activated in cycle 6, and the new highest throttle value ("4") is provided as request C.

Cycle 10 to Cycle 11

Because valid B is active in cycle 10, indicating that request B has a new value ("0"), request A ("4") is compared to request B ("0") to determine which is higher and valid C is activated in cycle 11. However, because the higher ("4") of request A and request B is not different than the request C in cycle 10, the request C is unchanged.

Cycle 14 to Cycle 15

Because valid A is active in cycle 14, indicating that request A has a new value ("0"), request A ("0") is compared to request B ("0") to determine which is higher. Because the higher ("0") of request A and request B is different than the request C in cycle 14, valid C is activated in cycle 15, and the new highest throttle value ("0") is provided as request C.

It should be noted that request B changes (i.e., from 5 to 7) in cycle 2, but valid B is not activated. This illustrates an example in which the target leaf node identifier received on the target ID input is not equal to the leaf node identifier in which the throttle request circuit is employed.

The throttle control signal 1208, in one example, may be provided as a three-bit binary value having a range from decimal "0" (b'000) to decimal "7" ('b111). The throttle control signal 1208 indicates a number of cycles of an eight-cycle window in which the processing circuits 1212 will be inactive or suspended. For example, a throttle control signal 1208 having a value of decimal "4" will cause the processing circuits 1212 to be active in 50% (four) of the cycles of an eight-cycle window and inactive in the other 50% (4) of the cycles of the window. A throttle control signal 1208 having a value of decimal "7" will cause the processing circuits 1212 to be active in only one cycle of an eight-cycle window and inactive in the other seven (7) cycles of the window. Details of how the activity of how the processing circuits 1212 are suspended or deactivated are beyond the scope of the present disclosure, but options include gating of enable signals to block transmissions on the network node and/or gating the clock signal CLK to stop sequencing of the digital logic circuits.

In response to receiving the throttle control signal 1208, the digital processing circuit 1108 in FIG. 11 throttles activity in a first plurality of cycles of the clock signal CLK. It should be understood that a three-bit binary throttle control signal 1208 is only an example. In general, the throttle control signal 1208 indicates a first number (X) in a range from zero ("0") to a second number "Y" (e.g., $2^N-1$, where N is a number of bits of the throttle control signal 1208). Therefore, in response to receiving the throttle control signal 1208, activity in the digital processing circuit 1108 in FIG. 11 may be suspended for X cycles of among the next window of Y+1 cycles. Accordingly, activity in the digital processing circuit 1108 is not suspended (i.e., the digital processing circuit 1108 is active) in Y+1−X cycles among the next Y+1 cycles of the clock signal CLK. Suspending activity in the processing circuit 1108 may include preventing transition of signal states in at least a portion of the first digital processing circuits in the X clock cycles.

Referring back to FIG. 11, the throttle request accumulate circuit 1100 in FIG. 11 in each leaf node 1114(1)-1114(L) in the IC chip 1104 may include the di/dt circuit 1116. The di/dt circuit 1116 is configured to generate a di/dt throttle request, such as the throttle request 1106(1), in response to determining that a rate of change of current provided to the leaf node 1114(1) exceeds a current change threshold. Such threshold may be programmed into a register (not shown) in the leaf node 1114(1). In some examples, in response to determining that a first rate of change of current in the leaf node 1114(1) exceeds a first threshold, the throttle request 1106(1) is set to a first throttle value 1113, and in response to a second rate of change of current in the leaf node exceeding a second threshold, higher than the first threshold, the throttle request 1106(1) is set to a second, higher throttle value 1113.

The temperature sensor 132 in FIG. 2 may be configured to detect a temperature in a region of the IC chip, including the plurality of leaf nodes 1114(1)-1114 (L), and generate the thermal power event 130(1) or another power event based on the temperature. One of the throttle requests 1106(2)-1106 (N) may comprise the thermal power event 130(1). The thermal sensor may be able to provide the thermal power event 130(1) comprising a plurality of throttle requests that each include a target leaf node identifier corresponding to one of the leaf nodes 1114(1)-1114(L).

The RAM circuit 502 in FIG. 5 may be configured to monitor each of the leaf nodes 1114(1)-1114(L), receiving information on current or power provided to the leaf nodes 1114(1)-1114(L), and generate a RAM throttle request, which may be any of the throttle requests 1106(2)-1106(N).

In addition, each of the LAM circuits 136(1)(0)-136(1)(N) containing one or more of the throttle request accumulate circuits 1100 may be associated with one or more of the PU clusters 108(0)-108(N), as shown in FIG. 2 and each of the PU clusters 108(0)-108(N) can include one or more processor cores 112(0)-112(N), which are each configured to execute instructions (e.g., software, firmware). In this regard, firmware instructions executed in the processor-based system may be employed to monitor activity in the region of the LAM circuits 136(1)(0)-136(1)(N), which is in the region of the leaf nodes 1114(1)-1114(L). In response to such monitoring, firmware instructions executed in the PU clusters 108(0)-108(N) may generate a firmware throttle request based on the detected activity in the leaf nodes 1114(1)-1114(L). Any higher-level activity management circuit (LAM 136, RAM 502, or PEL circuit 126) may also be a source of throttle requests.

Figure 15:
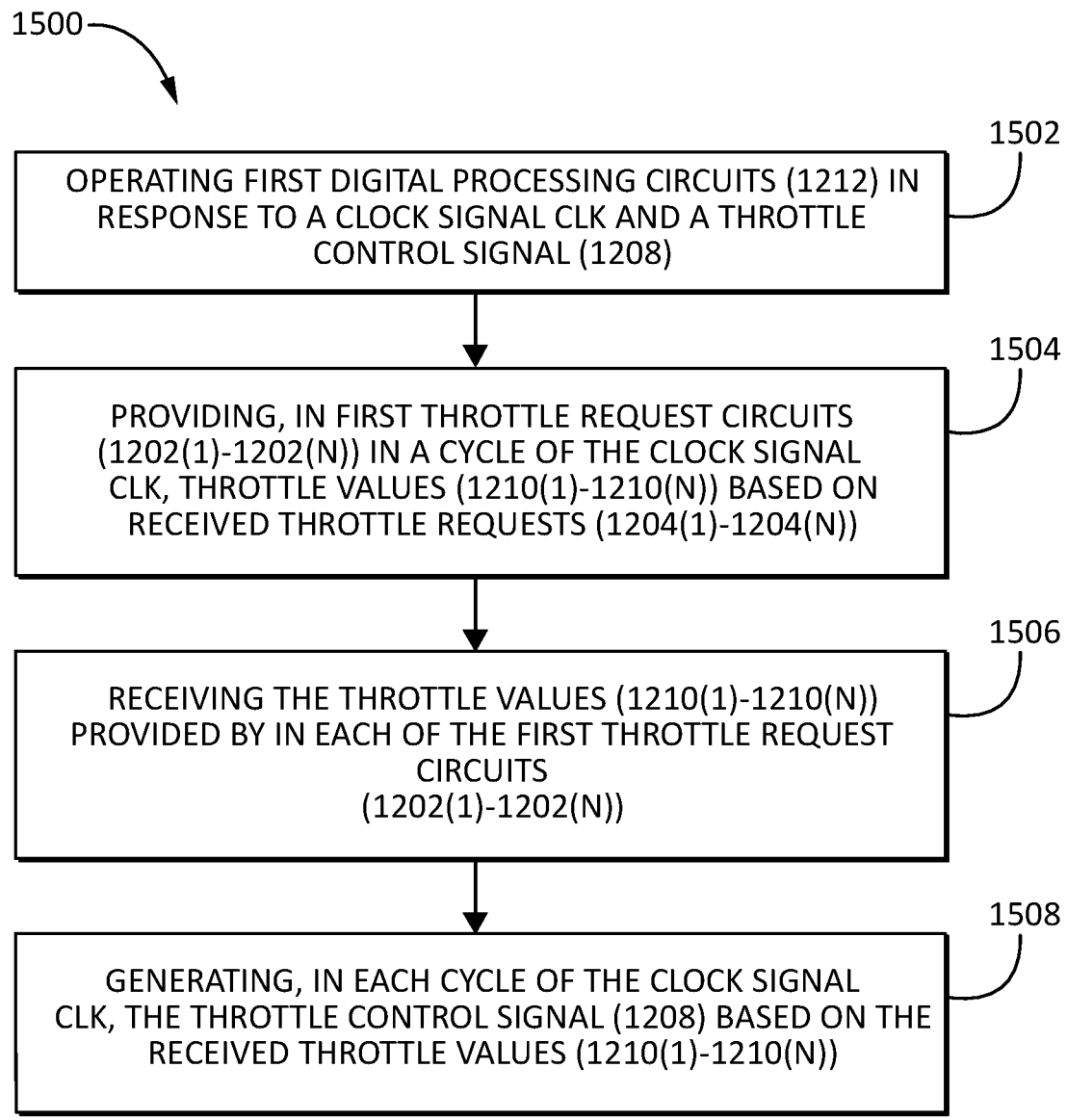
FIG. 15 is a flowchart illustrating an exemplary process for receiving throttle request(s) and, based on a throttle value, generating a throttle control signal in circuits including, but not limited to, the throttle request accumulate circuit in FIGS. 11-13.

FIG. 15 is a flowchart illustrating an exemplary process 1500 for receiving throttle request(s) 1204(1)-1204(N) and generating a throttle control signal 1208 in the throttle request accumulate circuit 1100 in FIGS. 11-13. The method includes operating first digital processing circuits 1212 in response to a clock signal CLK and a throttle control signal (block 1502) and providing, in first throttle request circuits 1202(1)-1202(N) in a cycle of the clock signal CLK, throttle values 1210(1)-1210(N) based on received throttle requests 1204(1)-1204(N) (block 1504). The method also includes receiving the throttle values 1210(1)-1210(N) provided by each of the first throttle request circuits 1202(1)-1202(N) (block 1506), and generating, in each cycle of the clock signal CLK, the throttle control signal 1208 based on the received throttle values 1210(1)-1210(N)(1508).

A throttle request accumulate circuit in an integrated circuit chip and configured to accumulate throttle requests and generate a throttle control signal to locally throttle activity of processing circuits in the processor-based system, including but not limited to the throttle request accumulate circuit and components and methods thereof illustrated in FIGS. 11-14, and according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 16:
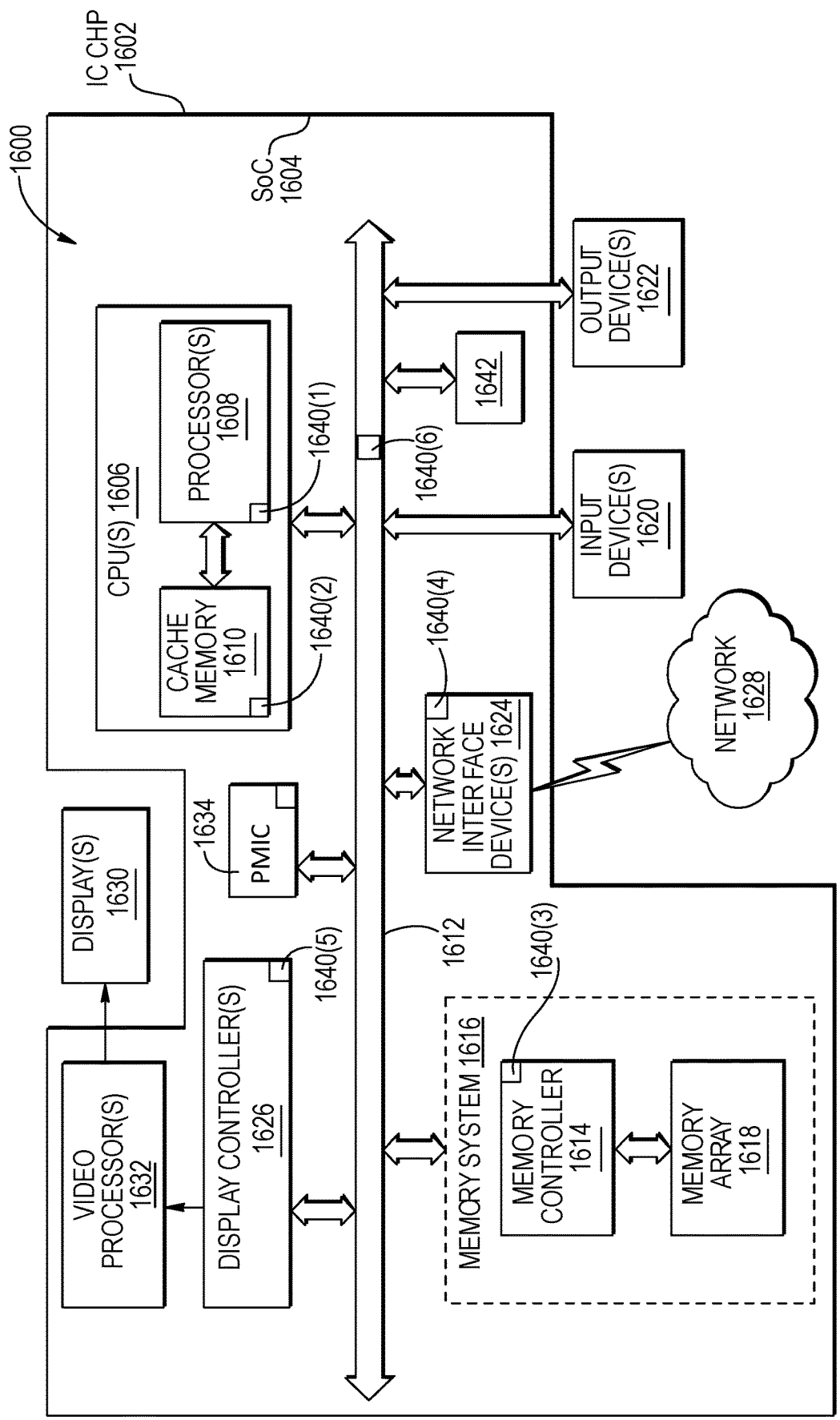
FIG. 16 is a block diagram of another exemplary processor-based system that includes the throttle request accumulate circuit configured to receive throttle request(s) based on a measured state of processing circuits and generate a throttle control signal to throttle processing activity in the processing circuits to dynamically respond to detected states of the processor-based system, including but not limited to the throttle request accumulate circuit in FIGS. 11-13.

FIG. 16 is a block diagram of another exemplary processor-based system that includes a throttle request accumulate circuit in an integrated circuit chip and configured to accumulate throttle requests and generate a throttle control signal to locally throttle activity of processing circuits in the processor-based system.

In this example, the processor-based system 1600 may be formed in an IC chip 1602 and as a system-on-a-chip (SoC) 1604. The processor-based system 1600 includes a central processing unit (CPU) (s) 1606 that includes one or more processors 1608, which may also be referred to as CPU cores or processor cores. The CPU 1606 may have cache memory 1610 coupled to the CPU 1606 for rapid access to temporarily stored data. The CPU 1606 is coupled to a system bus 1612 and can intercouple master and slave devices included in the processor-based system 1600. As is well known, the CPU 1606 communicates with these other devices by exchanging address, control, and data information over the system bus 1612. For example, the CPU 1606 can communicate bus transaction requests to a memory controller 1614, as an example of a slave device. Although not illustrated in FIG. 16, multiple system buses 1612 could be provided, wherein each system bus 1612 constitutes a different fabric.

Other master and slave devices can be connected to the system bus 1612. As illustrated in FIG. 16, these devices can include a memory system 1616 that includes the memory controller 1614 and a memory array(s) 1618, one or more input devices 1620, one or more output devices 1622, one or more network interface devices 1624, and one or more display controllers 1626, as examples. The input device(s) 1620 can include any type of input device, including, but not limited to, input keys, switches, voice processors, etc. The output device(s) 1622 can include any type of output device, including, but not limited to, audio, video, other visual indicators, etc. The network interface device(s) 1624 can be any device configured to allow an exchange of data to and from a network 1628. The network 1628 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1624 can be configured to support any type of communications protocol desired.

The CPU 1606 may also be configured to access the display controller(s) 1626 over the system bus 1612 to control information sent to one or more displays 1630. The display controller(s) 1626 sends information to the display(s) 1630 to be displayed via one or more video processor(s) 1632, which processes the information to be displayed into a format suitable for the display(s) 1630. The display(s) 1630 can include any type of display, including, but not limited to, a cathode ray tube (CRT), a liquid crystal display (LCD), a plasma display, a light emitting diode (LED) display, etc.

The IC chip 1602 also includes a throttle request accumulate circuit in an integrated circuit chip and is configured to accumulate throttle requests and generate a throttle control signal to locally throttle activity of processing circuits in the processor-based system, including but not limited to the throttle request accumulate circuit and components and methods thereof illustrated in FIGS. 11-14. The processor-based system may include a PMIC 1634 corresponding to the PMIC chip 125 in FIG. 1. The processor-based system may include a temperature sensor 1642 corresponding to the temperature sensor 132 in FIG. 1. The processor-based system 1600 can include one or more LAM circuits 1640 (1)-1640(6) that are associated with one or more of the processors 1608, the cache memory 1610, the memory controller 1614, the network interface device(s) 1624, the display controller 1626, and/or the system bus 1612 that are configured to monitor activity associated with these processing devices and reporting activity power events regarding activity of these devices within the hierarchical power management system. The LAM circuits 1640(1)-1640(6) may be the LAM circuits 136, 136R in the hierarchical power management systems 124, 624, 724 in FIGS. 1-3, 5-7, and 10A as examples.

Figure 17:
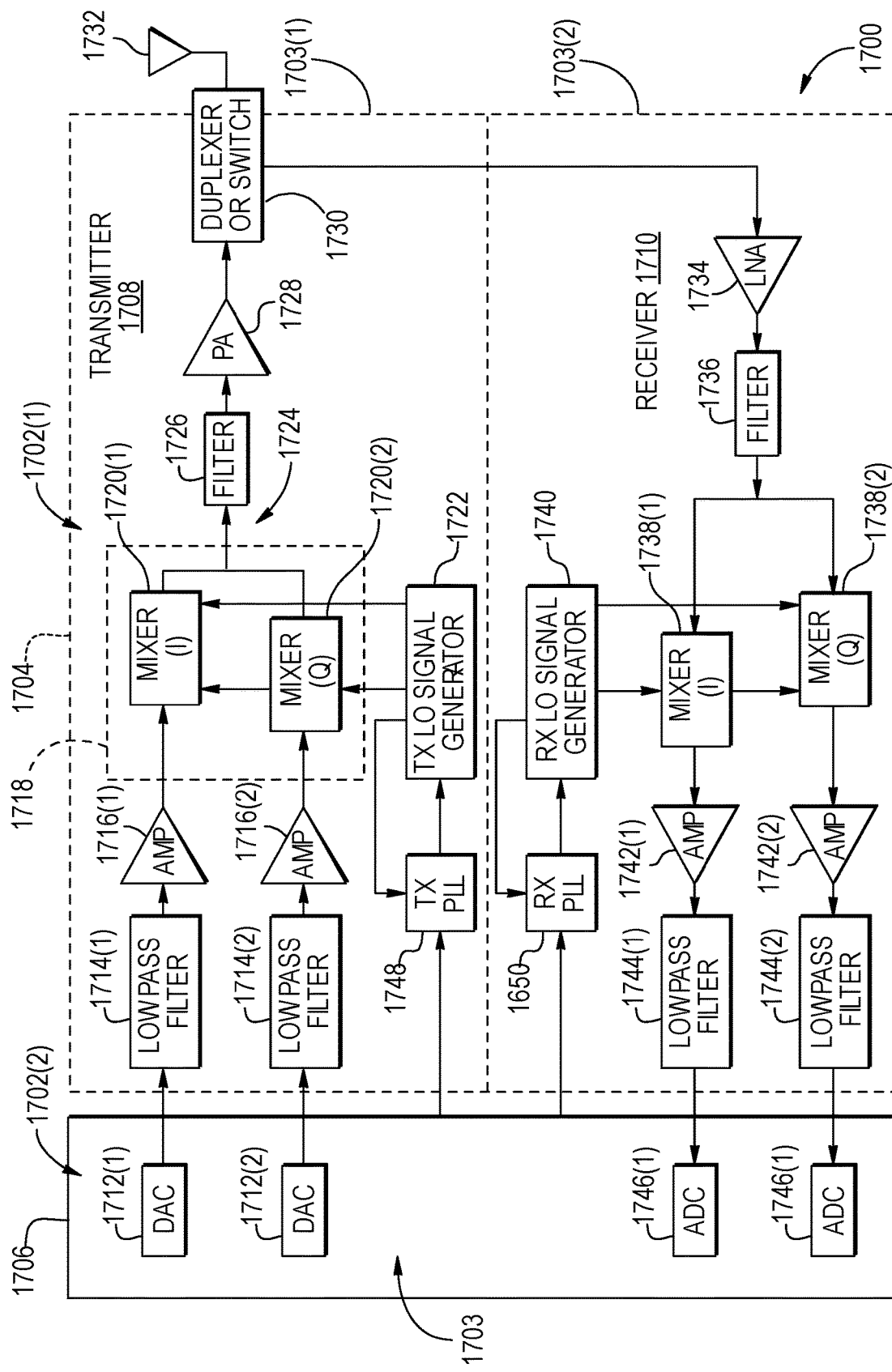
FIG. 17 is a block diagram of an exemplary wireless communication device that includes radio-frequency (RF) components that can include the throttle request accumulate circuit configured to receive throttle request(s) based on a measured state of processing circuits and generate a throttle control signal to throttle processing activity in the processing circuits to dynamically respond to detected states of the processor-based system, including but not limited to the throttle request accumulate circuit in FIGS. 11-13.

FIG. 17 illustrates an exemplary wireless communications device 1700 that can include throttle request accumulate circuits in an integrated circuit chip and be configured to accumulate throttle requests and generate a throttle control signal to locally throttle activity of processing circuits in the processor-based system, including but not limited to the throttle request accumulate circuit and components and methods thereof illustrated in FIGS. 11-14.

As shown in FIG. 17, the wireless communications device 1700 includes an RF transceiver 1704 and a data processor 1706. The RF transceiver 1704 and/or the data processor 1706 can include respective hierarchical power management systems 1702(1), 1702(2) configured to locally monitor activity of devices in the processor-based system to locally estimate and throttle its power consumption and report activity power events regarding estimated power consumption to a centralized PEL circuit configured to collect activity power events regarding power consumption of the monitored processing devices and throttle power in the IC chip in response, including but not limited to the hierarchical power management systems 174, 624, 724 and their exemplary components in FIGS. 1-3, 5-7, and 9A-10.

The components of the RF transceiver 1704 and/or data processor 1706 can be split among multiple different die 1703(1), 1703(2). The data processor 1706 may include a memory to store data and program codes. The RF transceiver 1704 includes a transmitter 1708 and a receiver 1710 that support bi-directional communications. In general, the wireless communications device 1700 may include any number of transmitters 1708 and/or receivers 1710 for any number of communication systems and frequency bands. All or a portion of the RF transceiver 1704 may be implemented on one or more analog ICs, RF ICs, mixed-signal ICs, etc.

The transmitter 1708 or the receiver 1710 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage and then from IF to baseband in another stage for the receiver 1710. In the direct-conversion architecture, a signal is frequency-converted between RF and baseband in one stage. The super-heterodyne and direct-conversion architectures may use different circuit blocks and/or have different requirements. In the wireless communications device 1700 in FIG. 17, the transmitter 1708 and the receiver 1710 are implemented with the direct-conversion architecture.

In the transmit path, the data processor 1706 processes data to be transmitted and provides I and Q analog output signals to the transmitter 1708. In the exemplary wireless communications device 1700, the data processor 1706 includes digital-to-analog converters (DACs) 1712(1), 1712(2) for converting digital signals generated by the data processor 1706 into the I and Q analog output signals, e.g., I and Q output currents, for further processing.

Within the transmitter 1708, lowpass filters 1714(1), 1714(2) filter the I and Q analog output signals, respectively, to remove undesired signals caused by the prior digital-to-analog conversion. Amplifiers (AMPs) 1716(1), 1716(2) amplify the signals from the lowpass filters 1714(1), 1714(2), respectively, and provide I and Q baseband signals. An upconverter 1718 upconverts the I and Q baseband signals with I and Q transmit (TX) local oscillator (LO) signals through mixers 1720(1), 1720(2) from a TX LO signal generator 1722 to provide an upconverted signal 1724. A filter 1726 filters the upconverted signal 1724 to remove undesired signals caused by the frequency upconversion as well as noise in a receive frequency band. A power amplifier (PA) 1728 amplifies the upconverted signal 1724 from the filter 1726 to obtain the desired output power level and provides a transmit RF signal. The transmit RF signal is routed through a duplexer or switch 1730 and transmitted via an antenna 1732.

In the receive path, the antenna 1732 receives signals transmitted by base stations and provides a received RF signal, which is routed through the duplexer or switch 1730 and provided to a low noise amplifier (LNA) 1734. The duplexer or switch 1730 is designed to operate with a specific receive (RX)-to-TX duplexer frequency separation, such that RX signals are isolated from TX signals. The received RF signal is amplified by the LNA 1734 and filtered by a filter 1736 to obtain a desired RF input signal. Down-conversion mixers 1738(1), 1738(2) mix the output of the filter 1736 with I and Q RX LO signals (i.e., LO_I and LO_Q) from an RX LO signal generator 1740 to generate I and Q baseband signals. The I and Q baseband signals are amplified by AMPs 1742(1), 1742(2) and further filtered by lowpass filters 1744(1), 1744(2) to obtain I and Q analog input signals, which are provided to the data processor 1706. In this example, the data processor 1706 includes analog-to-digital converters (ADCs) 1746(1), 1746(2) for converting the analog input signals into digital signals to be further processed by the data processor 1706.

In the wireless communications device 1700 of FIG. 17, the TX LO signal generator 1722 generates the I and Q TX LO signals used for frequency upconversion, while the RX LO signal generator 1740 generates the I and Q RX LO signals used for frequency downconversion. Each LO signal is a periodic signal with a particular fundamental frequency. A TX phase-locked loop (PLL) circuit 1748 receives timing information from the data processor 1706 and generates a control signal used to adjust the frequency and/or phase of the TX LO signals from the TX LO signal generator 1722. Similarly, an RX PLL circuit 1750 receives timing information from the data processor 1706 and generates a control signal used to adjust the frequency and/or phase of the RX LO signals from the RX LO signal generator 1740.

Those of skill in the art will further appreciate that the various illustrative logical blocks, modules, means, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any type of information desired. To clearly illustrate this interchangeability, various illustrative components, blocks, modules, means, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, means, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. Alternatively, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) chip comprising a processor-based system, the processor-based system comprising:
    first digital processing circuits configured to operate in response to a clock signal and a throttle control signal;
    a first throttle request accumulation circuit comprising:
       throttle request circuits configured to provide throttle values based on throttle requests received in the cycle of the clock signal;
    wherein the first throttle request accumulation circuit is configured to:
       receive the throttle values generated in each of the throttle request circuits; and
       in each cycle of the clock signal, generate the throttle control signal based on the received throttle values.
2. The IC chip of clause 1, wherein the first digital processing circuits are configured to throttle activity in a first number of cycles among a second number of cycles of the clock signal in response to receiving the throttle control signal.
3. The IC chip of clause 1 or 2, wherein:
    the throttle control signal indicates a first number (X) in a range from zero to a second number(Y); and
    the first digital processing circuits are configured to, in response to receiving the throttle control signal, suspend activity in X clock cycles among a next Y+1 clock cycles of the clock signal.
4. The IC chip of clause 3, wherein:
    the first digital processing circuits are further configured to, in response to receiving the throttle control signal, not suspend activity in (Y+1)–X clock cycles among the next Y+1 clock cycles of the clock signal.
5. The IC chip of clause 3 or 4, wherein the first digital processing circuits configured to suspend activity in X clock cycles comprises the first digital processing circuits being configured to prevent transition of signal states in at least a portion of the first digital processing circuits in the X clock cycles.
6. The IC chip of any of clauses 1-5, the processor-based system further comprising leaf nodes, each comprising:
    digital processing circuits; and
    a throttle request accumulation circuit comprising a throttle input interfaces, each configured to receive a throttle request;
    wherein:
       the digital processing circuits of a first leaf node of the leaf nodes comprises the first digital processing circuits; and
       the throttle request accumulation circuit of the first leaf node comprises the first throttle request accumulation circuit.
7. The IC chip of clause 6, wherein each of the throttle input interfaces in the throttle request accumulation circuit of each of the leaf nodes is coupled to one of the throttle request circuits of the throttle request accumulation circuit and comprises:
    a throttle request input configured to receive a throttle request;
    a target ID input configured to receive a target leaf node identifier; and
    a throttle value valid input configured to receive a valid indication, in a cycle of the clock signal, indicating the throttle request on the throttle request input and the target leaf node identifier on the target ID input are valid.
8. The IC chip of clause 6 or 7, each leaf node of the leaf nodes further comprising:
    a current change (di/dt) circuit configured to generate:
       a di/dt throttle request in response to determining that a rate of change of current provided to the leaf node exceeds a current change threshold;

wherein the throttle request received in one of the throttle input interfaces of the throttle request accumulation circuit in the leaf node comprises the di/dt throttle request.
9. The IC chip of clause 8, the di/dt circuit configured to generate the di/dt throttle request comprising:
 a first throttle value in response to determining that a first rate of change of current in the leaf node exceeds a first current change threshold; and
 a second throttle value, higher than the first throttle value, in response to determining that a second rate of change of current in the leaf node exceeds a second current change threshold higher than the first current change threshold.
10. The IC chip of any of clauses 7-9, the processor-based system further comprising a thermal sensor configured to:
 detect a temperature in a region of the IC chip comprising the leaf nodes;
 generate a thermal power event comprising a throttle value based on the temperature; and
 for each of the leaf nodes, provide a target leaf node identifier corresponding to the leaf node;
  wherein the throttle request received in one of the throttle input interfaces of the throttle request accumulation circuit in the leaf node comprises the thermal power event.
11. The IC chip of any of clauses 7-10, the processor-based system further comprising a regional activity management (RAM) circuit configured to monitor each of the leaf nodes, the RAM circuit configured to:
 receive information on current or power provided to the leaf nodes; and
 generate a RAM throttle request comprising a throttle value based on the information;
  wherein the throttle request received in one of the throttle input interfaces of the throttle request accumulation circuit in the leaf node comprises the RAM throttle request.
12. The IC chip of any of clauses 7-11, the processor-based system further comprising a firmware-controlled circuit configured to generate, in response to an instruction executed in the processor-based system, a firmware throttle request comprising a throttle value based on detected activity in the leaf node;
  wherein the throttle request received in one of the throttle input interfaces of the throttle request accumulation circuit in the leaf node comprises the firmware throttle request.
13. The IC chip of any of clauses 7-12, the throttle request accumulation circuit of each of the leaf nodes comprises:
 in each of the throttle request circuits, a target ID comparison circuit configured to:
  compare a first leaf node identifier of the first leaf node to a target leaf node identifier received on the target ID input in response to the valid indication received on the throttle value valid input; and
  generate a confirmed valid signal in response to the first leaf node identifier matching the target leaf node identifier received on the target ID input; and
 a merged valid circuit configured to generate a merged confirmed valid signal in response to the confirmed valid signal generated in any one of the throttle request circuits in the throttle request accumulation circuit.

14. The IC chip of clause 13, each of the throttle request circuits of the throttle request accumulation circuit of each of the leaf nodes comprises a request storage circuit comprising a storage request output and configured to generate, on the storage request output in a cycle of the clock signal, the throttle value comprising:
 the throttle request received on the throttle request input in response to the confirmed valid signal being active; and
 the throttle request generated on the storage request output in a previous cycle of the clock signal in response to the confirmed valid signal being inactive.
15. The IC chip of any of clauses 1-14, wherein the throttle request accumulation circuit further comprises a throttle value circuit further configured to generate the throttle control signal based on a highest throttle value among the throttle values received from the throttle request circuits.
16. The IC chip of any of clauses 13-15, the throttle value circuit, further comprising:
 a throttle value comparator configured to compare the throttle values generated in each of the throttle request circuits to determine a highest throttle value;
 a highest throttle storage circuit configured to, in response to the clock signal, generate the throttle control signal on an output based on the highest throttle value; and
 a throttle control valid circuit configured to generate, in a cycle of the clock signal, a throttle control valid signal in response to:
  receiving the confirmed valid signal; and
  determining that the highest throttle value is different than the throttle control signal.
17. The IC chip of any of clauses 1-16 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
18. A method of accumulating throttle requests to generate a throttle control signal for controlling power in a processor-based system, the method comprising:
 operating first digital processing circuits in response to a clock signal and a throttle control signal;
 providing throttle values based on throttle requests received in a cycle of the clock signal; and
 receiving, in a throttle value circuit, the throttle values generated in the first throttle request circuits; and
 generating, in each cycle of the clock signal, the throttle control signal based on the received throttle values.
19. The method of clause 18, further comprises throttling activity in the first digital processing circuits in a first number of cycles among a second number of cycles of the clock signal in response to receiving the throttle control signal.

20. The method of clause 18 or 19, wherein:
the throttle control signal indicates a first number (X) in a range from zero to a second number (Y); and
throttling activity in the first digital processing circuits in the first number of cycles among the second number of cycles of the clock signal further comprises, in response to receiving the throttle control signal, suspending activity in X clock cycles among a next Y+1 clock cycles of the clock signal.

21. The method of clause 20, wherein:
throttling activity in the first digital processing circuits in the first number of cycles among a second number of cycles of the clock signal further comprises, in response to receiving the throttle control signal, not suspending activity in Y−X clock cycles among the next Y+1 clock cycles of the clock signal.

22. The method of clause 20 or 21, wherein suspending activity in the first digital processing circuits for X clock cycles further comprises suspending the clock signal in at least a portion of the first digital processing circuits in the X clock cycles.

23. The method of any of clauses 18-22, further comprising, in a throttle request accumulation circuit in a first leaf node of leaf nodes in the processor-based system:
receiving a valid indication on a throttle value valid input;
receiving a target leaf node identifier on a target ID input;
comparing a first leaf node identifier of the first leaf node to the target leaf node identifier in response to receiving the valid indication; and
generating a confirmed valid signal in response to the first leaf node identifier matching the target leaf node identifier received in the target ID input; and
generating a merged confirmed valid signal in response to the confirmed valid signal generated in any one of the leaf nodes.

24. The method of clause 23, further comprising generating, on a storage request output in each of the first throttle request circuits of the throttle request accumulation circuit of each of the leaf nodes, the throttle value comprising:
the throttle request received on the throttle request input in response to the confirmed valid signal generated in the target ID comparison circuit of the throttle request circuit being active; and
the throttle request generated on the storage request output in a previous cycle of the clock signal in response to the confirmed valid signal being inactive.

25. The method of any of clauses 18-24, further comprising determining which of the throttle values receive from the first throttle request circuits is highest, wherein generating the throttle control signal further comprises generating the throttle control signal based on the highest one of the throttle values.

26 The method of clause 24 or 25, further comprising, in a throttle request accumulation circuit:
comparing the throttle values generated in each of the first throttle request circuits to determine the highest throttle value;
comparing the highest throttle value to a throttle control signal on an output of a throttle control storage circuit;
generating a throttle control valid signal in response to the confirmed valid signal and determining the highest throttle value is not equal to the throttle control signal; and in response to the clock signal, generating the throttle control signal on the output of the throttle control storage circuit based on the highest throttle value.

What is claimed is:

1. An integrated circuit (IC) chip comprising a processor-based system, the processor-based system comprising:
a first throttle request accumulate circuit configured to:
receive a plurality of throttle requests each comprising a first throttle value representing a first number X in a range of numbers from zero (0) to a second number Y; and
in each cycle of a clock signal, generate a throttle control signal comprising a second throttle value comprising a highest first throttle value among the plurality of throttle requests; and
first digital processing circuits configured to:
operate in response to the clock signal;
receive the throttle control signal; and
suspend operating in X cycles among Y+1 consecutive cycles of the clock signal in response to the throttle control signal.

2. The IC chip of claim 1, wherein:
the first digital processing circuits are further configured to operate in response to the clock signal in (Y+1)−X cycles among the Y+1 consecutive cycles of the clock signal.

3. The IC chip of claim 1, wherein the first digital processing circuits configured to suspend operation in the X cycles of the clock signal comprises the first digital processing circuits being configured to gate the clock signal to prevent transition of signal states in at least a portion of the first digital processing circuits in the X cycles.

4. The IC chip of claim 1, the first throttle request accumulate circuit further configured to change the second throttle value of the throttle control signal in response to an indication of a change to the first throttle value of one of the plurality of throttle requests.

5. The IC chip of claim 1, the processor-based system further comprising a plurality of leaf nodes, each comprising:
second digital processing circuits; and
a second throttle request accumulate circuit comprising throttle input interfaces, each configured to receive a throttle request;
wherein:
the second digital processing circuits of a first leaf node of the plurality of leaf nodes comprises the first digital processing circuits; and
the second throttle request accumulate circuit of the first leaf node comprises the first throttle request accumulate circuit.

6. The IC chip of claim 5, wherein each of the throttle input interfaces in the second throttle request accumulate circuit of each of the plurality of leaf nodes comprises:
a throttle request input configured to receive a throttle request;
a target ID input configured to receive a target leaf node identifier; and
a throttle value valid input configured to receive a valid indication indicating the throttle request received on the throttle request input and the target leaf node identifier received on the target ID input in a first cycle of the clock signal are valid.

7. The IC chip of claim 5, each leaf node of the plurality of leaf nodes further comprising:
- a current change (di/dt) circuit configured to generate:
  - a di/dt throttle request in response to determining that a rate of change of electrical current provided to the leaf node exceeds a current change threshold;
- wherein the throttle request received in one of the throttle input interfaces of the second throttle request accumulate circuit in the leaf node comprises the di/dt throttle request.

8. The IC chip of claim 7, the di/dt circuit configured to generate the di/dt throttle request comprising:
- a third throttle value in response to determining that a first rate of change of electrical current in the leaf node exceeds a first current change threshold; and
- a fourth throttle value, higher than the third throttle value, in response to determining that a second rate of change of electrical current in the leaf node exceeds a second current change threshold higher than the first current change threshold.

9. The IC chip of claim 6, the processor-based system further comprising a thermal sensor configured to:
- detect a temperature in a region of the IC chip;
- generate a thermal power event comprising a throttle request based on the temperature detected; and
- provide, to one of the throttle input interfaces of the second throttle request accumulate circuit in each leaf node of the plurality of leaf nodes, a leaf node identifier corresponding to the leaf node.

10. The IC chip of claim 6, the processor-based system further comprising a regional activity management (RAM) circuit, the RAM circuit configured to:
- receive information on electrical current or power provided to the plurality of leaf nodes; and
- provide a RAM throttle request comprising a throttle request based on the information received to one of the throttle input interfaces of the second throttle request accumulate circuit in the plurality of leaf nodes.

11. The IC chip of claim 6, the processor-based system further comprising a firmware control circuit configured to generate a firmware throttle request comprising a throttle request based on activity one of the throttle input interfaces of the second throttle request accumulate circuit in the plurality of leaf nodes, wherein the firmware throttle request is provided to one of the throttle input interfaces of the second throttle request accumulate circuit in each leaf node of the plurality of leaf nodes.

12. The IC chip of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A method in an integrated circuit (IC) chip comprising a processor-based system, the method comprising:
- receiving, in a first throttle request accumulate circuit, a plurality of throttle requests each comprising a first throttle value representing a first number X in a range of numbers from zero (0) to a second number Y;
- in each cycle of a clock signal, generating a throttle control signal comprising a second throttle value comprising a highest first throttle value among the plurality of throttle requests;
- operating first digital processing circuits in response to the clock signal;
- receiving, in the first digital processing circuits, the throttle control signal; and
- suspending operating of the first digital processing circuits in X cycles among Y+1 consecutive cycles of the clock signal in response to the throttle control signal.

14. The method of claim 13, further comprising:
- operating the first digital processing circuits in response to the clock signal in (Y+1)–X cycles among the Y+1 consecutive cycles of the clock signal.

15. The method of claim 13, wherein suspending operation in the X cycles of the clock signal comprises gating the clock signal to prevent transition of signal states in at least a portion of the first digital processing circuits in the X cycles.

16. The method of claim 13, further comprising changing, in the first throttle request accumulate circuit, the second throttle value of the throttle control signal in response to an indication of a change to the first throttle value of one of the plurality of throttle requests.

17. The method of claim 13, further comprising, in each of a plurality of throttle input interfaces in the first throttle request accumulate circuit:
- receiving a throttle request on a throttle request input;
- receiving a target leaf node identifier on a target ID input; and
- receiving a valid indication of a throttle value valid input indicating the throttle request received on the throttle request input and the target leaf node identifier received on the target ID input in a first cycle of the clock signal are valid.

18. The method of claim 13, further comprising, in the processor-based system comprising a plurality of leaf nodes each comprising a second throttle request accumulate circuit corresponding to the first throttle request accumulate circuit:
- generating a current change (di/dt) throttle request in a di/dt circuit in response to determining that a rate of change of electrical current provided to a target leaf node of the plurality of leaf nodes exceeds a current change threshold; and
- providing the di/dt throttle request to one of the throttle input interfaces of the second throttle request accumulate circuit in the target leaf node.

19. The method of claim 18, further comprising, in the di/dt circuit:
- generating the di/dt throttle request comprising a third throttle value in response to determining that a first rate of change of electrical current in the target leaf node exceeds a first current change threshold; and
- generating the di/dt throttle request comprising a fourth throttle value, higher than the third throttle value, in response to determining that a second rate of change of electrical current in the target leaf node exceeds a second current change threshold higher than the first current change threshold.

20. The method of claim 13, further comprising, in the processor-based system further comprising a plurality of leaf nodes each comprising a second throttle request accumulate circuit corresponding to the first throttle request accumulate circuit:

detecting, in a thermal sensor circuit, a temperature in a region of the IC chip; and generating a throttle request based on the temperature detected to the plurality of leaf nodes.

21. The method of claim 13, further comprising, in the processor-based system further comprising a plurality of leaf nodes each comprising a second throttle request accumulate circuit corresponding to the first throttle request accumulate circuit:

receiving, in a regional activity management (RAM) circuit, information regarding electrical current or power provided to each of the plurality of leaf nodes; and providing a RAM throttle request to the second throttle request accumulate circuit in each leaf node of the plurality of leaf nodes.

* * * * *